(12) United States Patent
Baek et al.

(10) Patent No.: US 8,904,090 B2
(45) Date of Patent: Dec. 2, 2014

(54) NON-VOLATILE MEMORY DEVICE, DEVICES HAVING THE SAME, AND METHOD OF OPERATING THE SAME

(75) Inventors: Sung Hoon Baek, Daejeon (KR); Won Moon Cheon, Hwaseong-si (KR)

(73) Assignee: Samsung Electronics Co., Ltd., Samsung-ro, Yeongtong-gu, Suwon-si, Gyeonggi-do (KR)

( * ) Notice: Subject to any disclaimer, the term of this patent is extended or adjusted under 35 U.S.C. 154(b) by 302 days.

(21) Appl. No.: 13/289,701

(22) Filed: Nov. 4, 2011

(65) Prior Publication Data

US 2012/0151124 A1 Jun. 14, 2012

(30) Foreign Application Priority Data

Dec. 8, 2010 (KR) ........................ 10-2010-0124839

(51) Int. Cl.
*G06F 12/02* (2006.01)
*G06F 12/08* (2006.01)
*G06F 12/00* (2006.01)
*G06F 13/00* (2006.01)

(52) U.S. Cl.
CPC .... *G06F 12/0246* (2013.01); *G06F 2212/7205* (2013.01); *G06F 12/08* (2013.01); *G06F 12/02* (2013.01)
USPC ........... 711/103; 711/100; 711/159; 711/141; 711/165; 711/135; 714/100; 707/813

(58) Field of Classification Search
CPC .......... G06F 12/02; G06F 12/08; G06F 12/00
USPC .......................................... 711/103, 135, 159
See application file for complete search history.

(56) References Cited

U.S. PATENT DOCUMENTS

| | | | |
|---|---|---|---|
| 7,444,461 B2 | 10/2008 | Traister et al. | |
| 2008/0034175 A1* | 2/2008 | Traister et al. | 711/159 |
| 2010/0017650 A1* | 1/2010 | Chin et al. | 714/6 |
| 2011/0145473 A1* | 6/2011 | Maheshwari | 711/103 |

FOREIGN PATENT DOCUMENTS

| | | |
|---|---|---|
| JP | 2001-184255 | 7/2001 |
| JP | 2007-193883 | 8/2007 |
| KR | 1020097004476 | 5/2009 |

\* cited by examiner

*Primary Examiner* — Sanjiv Shah
*Assistant Examiner* — Gautam Sain
(74) *Attorney, Agent, or Firm* — Muir Patent Consulting, PLLC

(57) ABSTRACT

A flash memory and a method of writing data to a flash memory during garbage collection of the flash memory is provided. First, a garbage collection process on a victim block of flash memory may be initiated. A garbage collection process may comprise a plurality of garbage collection operation. A program command and corresponding program data may be received. After a first garbage collection operation has finished and a portion of flash data from the victim block has been written to a free block, a portion of the program data may be written to that free block. If data remains in the victim block, a second garbage collection operation may be performed.

10 Claims, 20 Drawing Sheets

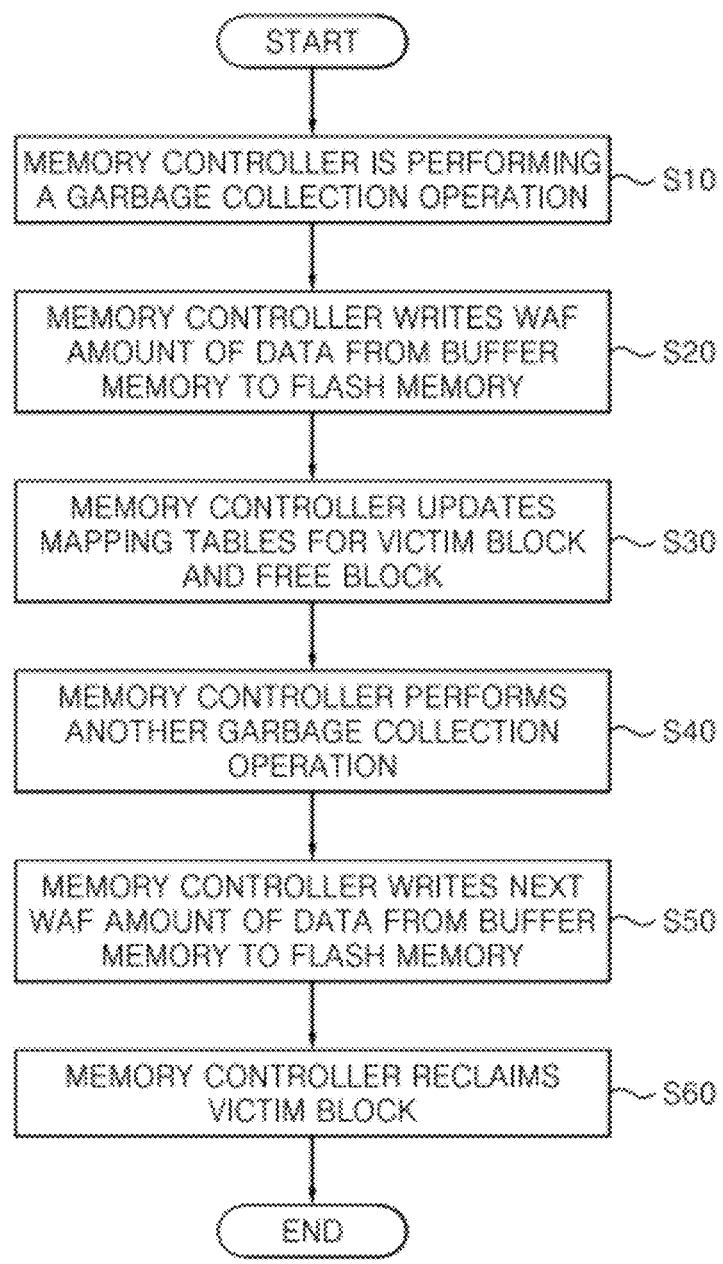

NON-VOLATILE MEMORY DEVICE,
DEVICES HAVING THE SAME, AND
METHOD OF OPERATING THE SAME

CROSS-REFERENCE TO RELATED
APPLICATIONS

This application claims priority under 35 U.S.C. §119(a) from Korean Patent Application No. 10-2010-0124839 filed on Dec. 8, 2010, the disclosure of which is hereby incorporated by reference in its entirety.

BACKGROUND

Embodiments of the present disclosure relate to a garbage collection of blocks included in a flash memory, and more particularly, to a method improving a write performance of the flash memory by writing new data during a garbage collection operation and devices performing the method.

In a non-volatile memory device, the device periodically initiates a garbage collection process to reclaim a storage capability of the memory device. Generally, the memory device may write new data after a garbage collection is finished. Accordingly, a write delay occurs as a result of the garbage collection process.

SUMMARY

In one embodiment, a method of manipulating data in a flash memory in a memory device while performing garbage collection of the flash memory comprises the steps of: beginning a garbage collection process on one or more victim blocks of flash memory, the garbage collection process comprising performing one or more garbage collection operations, where each operation copies a set of valid data from the one or more victim block to one or more free blocks in the flash memory; beginning a first garbage collection operation; receiving a program command with a corresponding amount of program data; storing at least a portion of the program data in a buffer memory in the memory device; after the first garbage collection operation is performed, copying a first set of the program data from the buffer memory to the one or more free blocks; and when additional valid data remains in the one or more victim blocks after the copying of the first set of the program data, performing a second garbage collection operation of the garbage collection process.

In one embodiment, a method of manipulating data in a memory system comprising a plurality of memory chips while performing garbage collection of the memory system comprises the step of: beginning a garbage collection process on one or more victim stripe blocks of flash memory, wherein the memory system includes a plurality of stripe blocks. Each stripe block includes at least one stripe, where a stripe is a combination of an Nth page, where N is a positive integer, in each memory cell array of a block across the plurality of memory chips. The garbage collection process comprises performing one or more garbage collection operations, where each operation copies valid data from at least one victim stripe in the victim stripe block to at least one free stripe in a free stripe block in the memory system. The method further comprises the steps of: beginning a first garbage collection operation; receiving a program command with a corresponding amount of program data; storing at least a portion of the program data in a buffer memory in the memory device; after the first garbage collection operation is performed, copying a first set of the program data from the buffer memory to the free stripe; and when the victim stripe block has additional victim stripes that include valid data after the step of copying the first set of the program data, performing a second garbage collection operation of the garbage collection process.

In one embodiment, a memory device comprises: a flash memory including a plurality of blocks, the plurality of blocks including one or more blocks configured to be a victim block subject to a garbage collection process and one or more free blocks; a CPU configured to receive a program command and program data corresponding to the program command; a buffer memory configured to store the program data; and a memory controller configured to control the flash memory to begin a garbage collection process on the victim block, where the garbage collection process comprises at least one garbage collection operation, wherein, for each garbage collection operation, the memory controller is configured to copy a set of valid data from the one or more victim blocks to the one or more free blocks in the flash memory. In one embodiment, the memory controller is configured to: control the flash memory to perform a first garbage collection operation; control the flash memory to copy a first set of the program data to the one or more free blocks, and when additional valid data remains in the one or more victim blocks, control the flash memory to perform a second garbage collection operation.

BRIEF DESCRIPTION OF THE DRAWINGS

The above and other aspects and features of the disclosure will become apparent by describing in detail exemplary embodiments thereof with reference to the attached drawings, in which:

FIG. 6 is a flowchart displaying an exemplary operation method of a memory controller illustrated in FIG. 1;

DETAILED DESCRIPTION OF THE EMBODIMENTS

Figure 1:
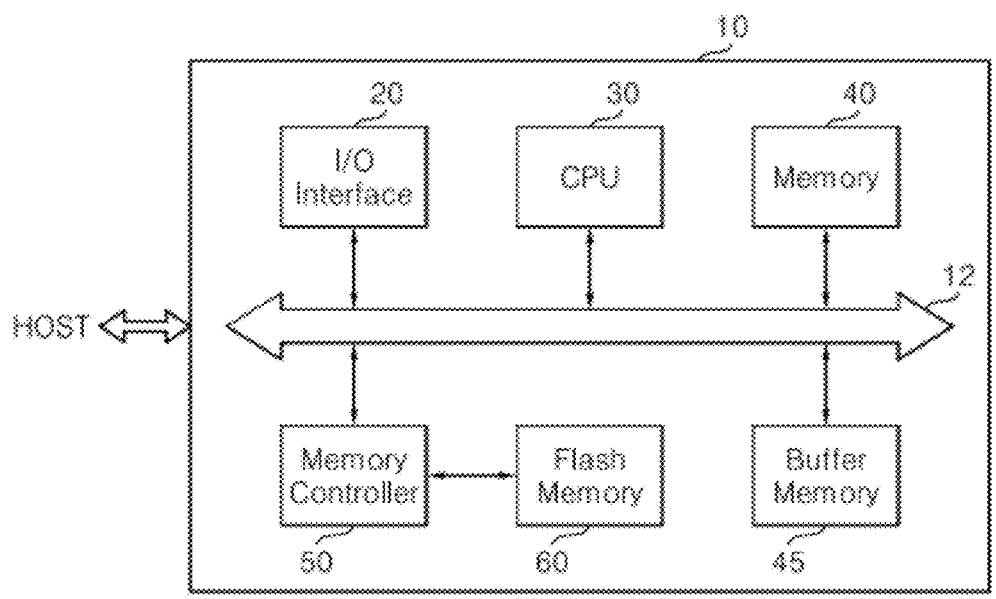
FIG. 1 is a block diagram displaying an exemplary schematic configuration of a memory device according to an example embodiment.

The present disclosure will be described more fully hereinafter with reference to the accompanying drawings, in which various embodiments are shown. The invention may, however, be embodied in many different forms and should not be construed as limited to the embodiments set forth herein. In the drawings, the size and relative sizes of layers and regions may be exaggerated for clarity. Like numbers refer to like elements throughout. As used herein, the term "and/or" includes any and all combinations of one or more of the associated listed items and may be abbreviated as "/".

It will be understood that, although the terms first, second, etc. may be used herein to describe various elements, these elements should not be limited by these terms. Unless indicated otherwise, these terms are only used to distinguish one element from another. For example, a first signal could be termed a second signal, and, similarly, a second signal could be termed a first signal without departing from the teachings of the disclosure.

The terminology used herein is for the purpose of describing particular embodiments only and is not intended to be limiting. As used herein, the singular forms "a", "an" and "the" should not exclude the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which the this disclosure belong. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

FIG. 1 is a block diagram displaying a schematic configuration of a memory device according to an example embodiment. Referring to FIG. 1, the memory device 10 may include an input/output (I/O) interface 20, a CPU 30, a memory 40, a memory controller 50 and a flash memory 60.

The input/output interface 20 facilitates data exchange between a host HOST and a memory device 10. The input/output interface 20 may receive a program command or data corresponding to a program command from the host HOST. In addition, the input/output interface 20 may transmit a program command or data output from the host HOST to a CPU 30 through a data bus 12.

The CPU 30 may control a general operation of the memory device 10. For example, the CPU 30 may control data exchange between the host HOST and the I/O interface 20. Moreover, the CPU 30 may control the memory device 10 to perform an operation in accordance with a command output from the host HOST. The CPU 30 may receive a program command or data corresponding to a program command from the host HOST through the data bus 12. The CPU 30 may control the memory device 10 to program data corresponding to the program command in a memory 40 or a flash memory 60.

According to an example embodiment, the CPU 30 may receive a program command or program data from the host HOST. The CPU may then transmit a program command or a control signal for programming data to a memory controller 50, such that the CPU instructs the memory controller 50 to program the data in the flash memory 60 in conjunction with the program command or control signal. Accordingly, the flash memory 60 may program data corresponding to the program command in a memory cell array under a control of the memory controller 50. In one embodiment, the program command is a write command. The type of program command is not limiting herein. Exemplary embodiments may be shown that correspond to a write command, but other types of commands would be interchangeable with the write command. For example, other program commands that manipulate or process data in the flash memory 60 would be interchangeable with the write command.

The memory 40 may store different kinds of data for controlling an operation of the memory device 10. The memory 40 may be embodied in a non-volatile memory, e.g., read only memory ROM, and may store a program code controlling an operation of the CPU 30.

The CPU 30 may control the memory device 10 to store a program command, or data corresponding to the program command, output from the host HOST in a buffer memory 45. In one embodiment, where the program command is a write command, the buffer memory 45 may operate as a write buffer. The buffer memory 45 may be embodied in a volatile memory, e.g., DRAM, and may store data transmitted or received between the host HOST and the CPU 30. According to an example embodiment, the buffer memory 45 may be embodied inside the memory controller 50. In another embodiment, the buffer memory 45 may be in the memory device 10.

The CPU 30 may control the operation of the memory controller 50. In one embodiment, the CPU 30 may control operation of the memory controller 50 by sending it program commands or program data corresponding to a program command. In one embodiment, the CPU 30 may control the operation of the memory controller 50 by sending it a control signal. The use of a program command or a memory signal is not intended to be limiting herein, and either or both may be used as appropriate to communicate between the CPU 30 and the memory controller 50.

The memory controller 50, in turn, may control an operation of the flash memory 60 in response to a program command or control signal from the CPU 30. The memory controller 50 may also control an operation of the flash memory 60 as a part of its own memory management. For example, the memory controller 50 may perform garbage collection on one or more blocks embodied in a memory cell array included in the flash memory 60 in response to a program command from the CPU 30 or under the control of the memory controller 50 as part of its memory management processes.

Garbage collection typically occurs as an automatic operation carried out by a memory controller of a memory to manage memory efficiently. In some embodiments, though, garbage collection could be initiated by a command signal or program command from a CPU or a host. Garbage collection reclaims used memory that is not likely to be accessed in the future. For example, in a block of flash memory, if a large amount of the data in a block has been marked as invalid, a memory controller 50 may perform a garbage collection operation on that block (called the victim block), copying the valid data in the victim block to a new block (called the free block) and then reclaiming the victim block. Various methods of garbage collection exist, where the methods of copying the valid data to the free block differ or the reclamation of the unusable data differs, for example. Though various embodiments using different types of garbage collection methods are described herein, the type of garbage collection method used is not limited to such methods.

In one embodiment, garbage collection may be implemented as a series of operations, processing a certain number of victim blocks or a certain number of pages in a victim block during each operation, until all of the memory to be reclaimed has been processed. Processing may be done by different types of garbage collection method. In one embodiment where a single block is to be reclaimed, each garbage collection operation processes four pages at a time. That is, each garbage collection operation copies four pages of valid data from the victim block into a free block. After enough garbage collection operations have been completed to copy all of the valid data from the victim block into the free block, the victim block may be reclaimed. The number of pages and/or blocks that are processed during a garbage collection operation is not limited to the specific examples described herein.

In one embodiment, the memory controller 50 may perform a write operation in the middle of garbage collection. For example, if the host HOST outputs a write command to the CPU 30, the CPU 30 may interrupt the garbage collection process to write the data received from the host HOST. In one embodiment, the memory device 10 stores a write amplification factor (WAF) that may be a ratio of data written to the flash memory 60 to the number of garbage collection operations performed. The WAF may be the amount of data written to the flash memory 60 after each garbage collection operation. For example, if the WAF is 2, 2 pieces of data in the buffer memory 45 may be written to the flash memory after each garbage collection operation, where a piece of data may be a set of one or more bits of data having a particular size (e.g., pages, bytes, etc.). If the WAF is 5, then 5 pieces of data in the buffer memory 45 may be written to the flash memory after each garbage collection operation. The WAF may be stored in the memory 40 or may be transmitted as part of the write command from the HOST. The WAF may also be stored in the flash memory 60. In one embodiment, if the WAF is stored in the memory 40 or the flash memory 60, the size of the buffer memory 45 may correspond to the WAF. For example, if the WAF is 3, the size of the buffer memory 45 may be a multiple of 3 (i.e. the buffer memory may store 6 pieces of data, or 9 pieces of data). The amount of the WAF and the size of the buffer memory 45 are not limiting herein.

In one embodiment, when the CPU 30 receives a write command and write data corresponding to the write command from the host HOST while the memory controller 50 is performing garbage collection, the CPU 30 may store the write data in the buffer memory 45 and control the memory controller 50 to write data from the buffer memory 45 to the flash memory 60 in accordance with the WAF before starting another garbage collection operation. If a garbage collection operation is in progress, the CPU 30 may control the memory controller 50 to write data from the buffer memory 45 after the completion of that garbage collection operation. After the memory controller 50 writes an amount of data from the buffer memory 45 into the flash memory 60 in accordance with the WAF, the CPU 30 may control the memory controller 50 to start another garbage collection operation. The CPU 30 may continue to control the memory controller 50 to write data from the buffer memory 45 after each garbage collection operation until all of the data in the write command from the host HOST has been written or garbage collection is finished. If garbage collection is finished before all of the write data corresponding to the write command from the host HOST has been written, the CPU 30 may control the memory controller 50 to write the remaining write data into the flash memory 60. If all of the data in the write command from the host HOST has been written before garbage collection is finished, then the CPU 30 may control the memory controller 50 to continue its garbage collection process.

The flash memory 60 may include a plurality of blocks and store different kinds of data under a control of the memory controller 50. In one embodiment, the memory controller 50 may initiate a garbage collection on a plurality of blocks and each garbage collection operation may process each block individually or may process a plurality of blocks at once.

Figure 2:
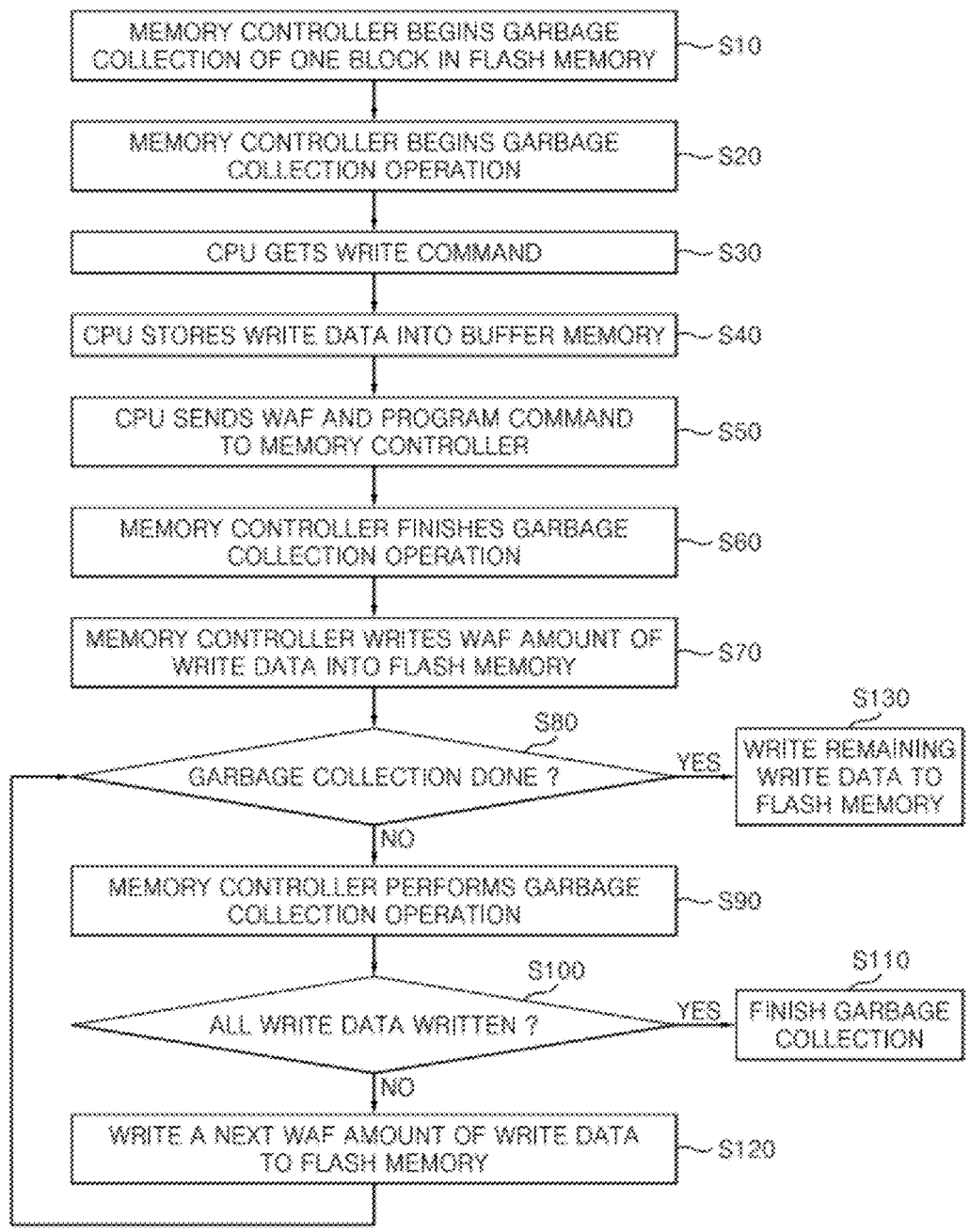
FIG. 2 is a flowchart displaying an exemplary method of operation of a memory device illustrated in FIG. 1.

FIG. 2 is an exemplary flowchart displaying a method in which garbage collection of a block of flash memory 60 is interrupted to write data into the flash memory 60 in the system of FIG. 1. Referring to FIGS. 1 and 2 in step S10, the memory controller 50 begins garbage collection of a block of memory in flash memory 60. In step S20, the memory controller 50 may begin a garbage collection operation, wherein the garbage collection operation processes, for example, 4 pages of valid data at a time. In step S30, the CPU 30 then receives a write command from the host HOST and write data W from the host HOST. In step S40, the CPU 30 stores a first chunk of the write data W into the buffer memory 45. In step S50, the CPU 30 sends a WAF and either a control signal or program command to the memory controller 50 to write the data in the buffer memory 45. In one embodiment, the order of steps S40 and S50 may be switched, so that step S40 is performed before step S50. In one embodiment, the WAF is stored in the flash memory and retrieved by the memory controller 50 (not shown). In step S60, the memory controller 50 then finishes the first garbage collection operation. In step S70, the memory controller then writes a set of data from the buffer memory 45 that includes a quantity of data in accordance with the WAF. The set of data may include, for example, all of the write data W to be written from the host HOST or a portion of the write data W. In step S80, the memory controller 50 determines whether the garbage collection process is done or not. In step S90, if the garbage collection process is not done, the memory controller then performs another garbage collection operation. In step S100, the memory controller 50 determines whether all of the write data W received from the host HOST has been written or not. In step S110 if all of the write data W received from the host HOST has been written, then the garbage collection process may finish unless interrupted again by another write command from the host HOST. In step S120, if not all of the write data W has been written, then CPU stores a next chunk of the write data W in the buffer memory 45 and the memory controller 50 writes a next amount of the write data W in accordance with the WAF to the flash memory 60. In step S130, if the entire block of data has undergone the garbage collection process, then the CPU 30 controls the memory controller 50 to write the remaining write data W into the flash memory 60. The memory controller 50 may reclaim the block of data that has undergone the garbage collection process (not shown). In one embodiment, the order of step S130 and the reclamation step (not shown) may be switched such that reclamation of the garbage collected block occurs before writing the remaining write data to the flash memory 60.

Figure 3:
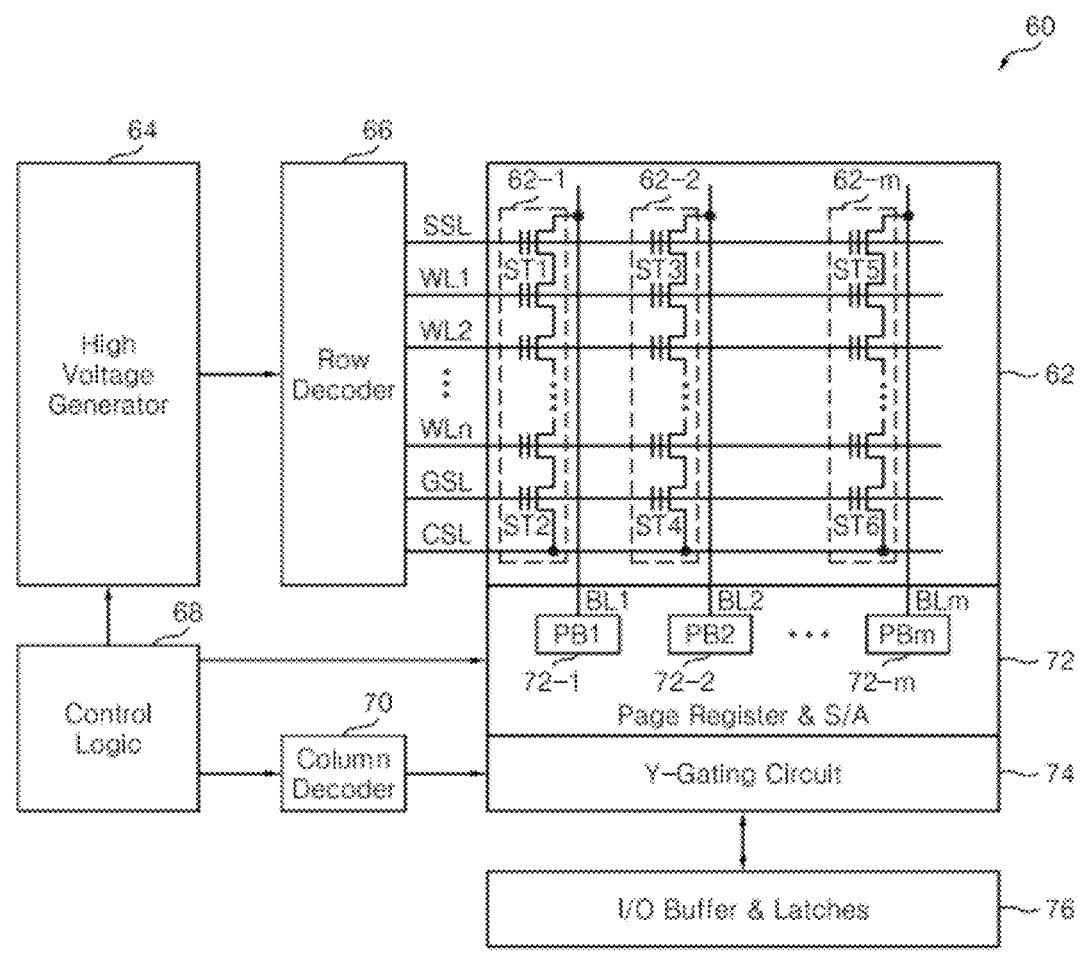
FIG. 3 is a block diagram displaying an exemplary schematic configuration of a flash memory illustrated in FIG. 1.

FIG. 3 is a block diagram displaying an exemplary schematic configuration of a flash memory illustrated in FIG. 1. The flash memory 60 may include a memory cell array 62, a high voltage generator 64, a row decoder 66, a control logic 68, a column decoder 70, a page register & sense amplifier (S/A) 72, a Y-gating circuit 74 and an input/output buffer & latches 76. The control logic 68 controls the operation of the flash memory 60 and may respond to commands from the memory controller 50 or may act on its own to perform automated tasks. In one embodiment, the control logic 68 may automatically initiate a garbage collection operation. In one embodiment, the control logic 68 may have a garbage collection method stored therein that is used when the control logic 68 initiates a garbage collection operation.

In one embodiment, the memory cell array 62 may include a plurality of cell strings 62-1, 62-2, ..., 62-$m$, where m is a positive integer. Each of the plurality of cell strings 62-1, 62-2, ..., 62-$m$ may include a plurality of memory cells. Each cell string 62-1, 62-2, ..., or 62-$m$ may be laid out or embodied on a two dimensionally identical plane as illustrated in FIG. 3, or may be laid out or embodied on three dimensionally different planes or layers as illustrated in FIG. 4.

Figure 4:
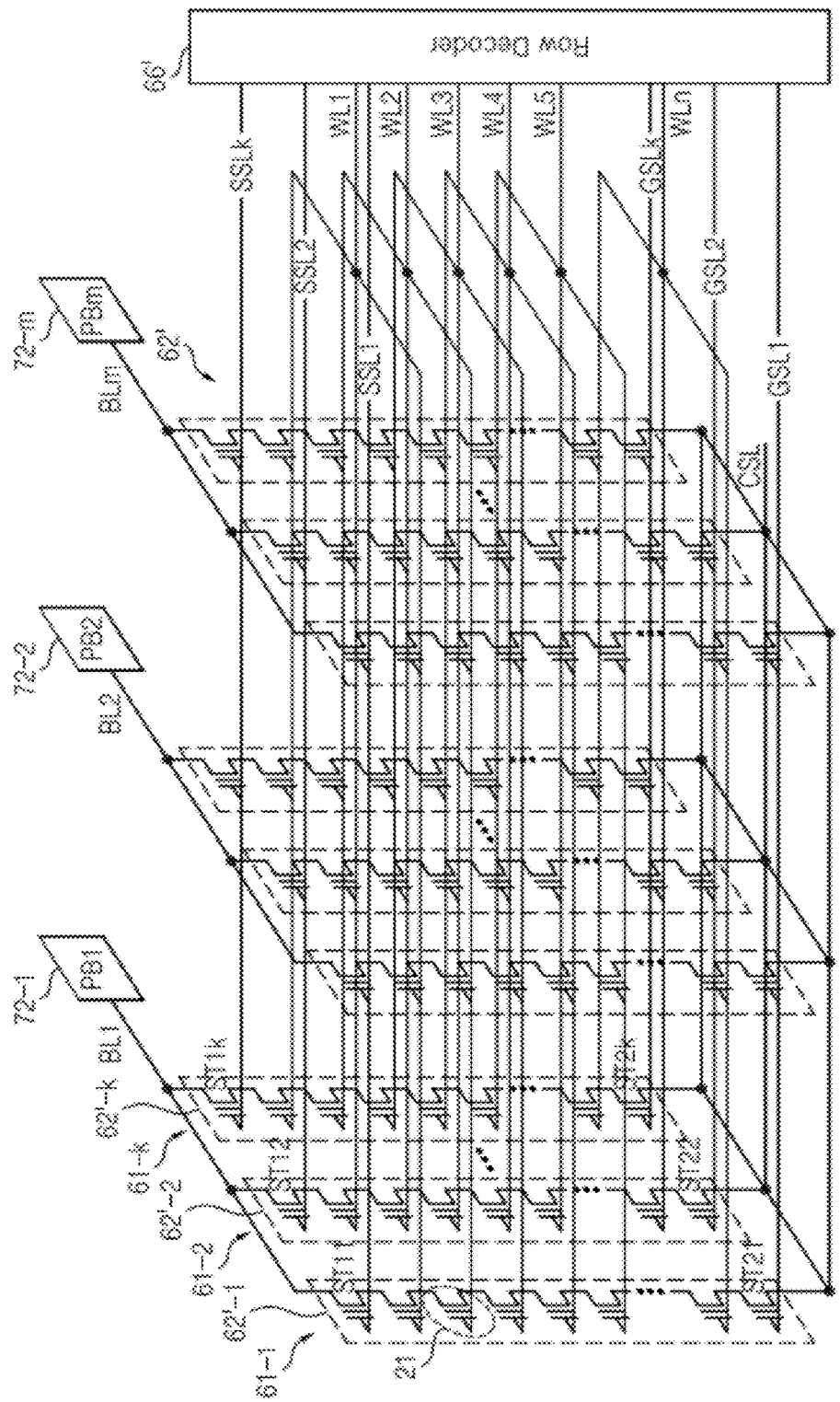
FIG. 4 depicts a block diagram of an exemplary memory array, a row decoder and a page buffer when a memory cell array of FIG. 3 is embodied in a three dimensional memory cell array.

As illustrated in FIG. 4, a first cell string 62'-1 may be laid out on a first layer 61-1, a second cell string 62'-2 may be laid out or embodied on a second layer 61-2 which is different from the first layer 61-1, and a $K^{th}$ cell string 62'-$k$ may be three dimensionally laid out on a $k^{th}$ layer 61-$k$ which is different from the second layer 61-2.

A cell string 62-1 illustrated in FIG. 3 may include, for example, a plurality of memory cells connected in series between a first selection transistor ST1 connected to a bit line BL1 and a second selection transistor ST2 connected to a ground. A cell string 62-2 may include a plurality of memory cells connected in series between a third selection transistor ST3 connected to a bit line BL2 and a fourth selection transistor ST4 connected to a ground. A cell string 62-$m$ may include a plurality of memory cells connected in series between a fifth selection transistor ST5 connected to a bit line BLm and a sixth selection transistor ST6 connected to a ground.

In certain embodiments, each of a plurality of memory cells included in each cell string 62-1, 62-2, ..., 62-$m$ may be embodied in an electrically erasable programmable read-only memory EEPROM which may store one bit or more. According to an example embodiment, each of the plurality of memory cells may be embodied in a NAND flash memory, e.g., a single level cell (SLC) or a multi-level cell (MLC), which may store one bit or more. Accordingly, each cell string 62-1, 62-2, ..., 62-$m$ may be called a NAND string.

According to a control of the control logic 68, the high voltage generator 64 may generate a plurality of voltages including a program voltage necessary for performing a program operation, a read voltage necessary for performing a read operation, a verify voltage necessary for performing a verify operation, and an erase voltage necessary for performing an erase operation. The high voltage generator 64 may also output the voltages necessary for performing each operation to the row decoder 66. The control logic 68 may control an operation of the high voltage generator 64, the column decoder 70 and the page buffer & sense amplifier 72 according to a command input from outside, e.g., a program command, a read command or an erase command.

The page register & sense amplifier 72 may include a plurality of page buffers 72-1, 72-2, ..., 72-$m$. Each of the plurality of page buffers 72-1, 72-2, ..., 72-$m$ may operate as a driver for programming data in the memory cell array 62 during a program operation under a control of the control logic 68. Each of the plurality of page buffers 72-1, 72-2, ..., 72-$m$ may operate as a sense amplifier which determines a threshold voltage of a memory cell selected among a plurality of memory cells of the memory cell array 62 during a read operation or a verify operation under a control of the control logic 68.

The column decoder 70 may decode column addresses under a control of the control logic 68 and output decoding signals to the Y-gating circuit 74. The Y-gating circuit 74 may control data transmission between the page register & sense amplifier 72 and the input/output buffer & latches 76 in response to decoding signals output from the column decoder 70. The input/output buffer & latches 76 may transmit data to the Y-gating circuit 74 or to the outside through a data bus.

FIG. 4 depicts a block diagram of a memory cell array, a row decoder and a page buffer when the memory cell array of FIG. 3 is embodied in a three dimensional memory cell array. As illustrated in FIG. 4, each of a plurality of layers 61-1, 61-2, ..., 61-$k$, where k is a positive integer, embodied in a memory cell array 62' may include a plurality of cell strings. A plurality of layers 61-1 through 61-$k$ may be embodied in a wafer stack, a chip stack, or a cell stack. An electrical connection between layers may use a vertical electrical element like a through substrate via (TSV), wire bonding or a bump.

A first cell string 62'-1 embodied on a first layer 61-1 may include a plurality of non-volatile memory cells, e.g., NAND flash memory cells, connected in series between a plurality of selection transistors ST11 and ST21. A second cell string 62'-2 embodied on a second layer 61-2 may include a plurality of non-volatile memory cells, e.g., NAND flash memory cells, connected in series between a plurality of selection transistors ST12 and ST22. A $k^{th}$ cell string 62'-$k$ embodied on a $k^{th}$ layer 61-$k$ may include a plurality of non-volatile memory cells, e.g., NAND flash memory cells, connected in series between a plurality of selection transistors ST1$k$ and ST2$k$.

A row decoder 66' illustrated in FIG. 4 may supply a selection signal to each string selection line SSL1, SSL2, ..., SSLk connected to each gate of each first selection transistors ST11, ST12, ..., ST1$k$ embodied on each layer 61-1, 61-2, ..., 61-$k$. In response to the selection signal, the first selection transistor ST11, ST12, ..., ST1$k$ may become selectively turned on or off.

In addition, a row decoder 66' may supply a selection signal to each ground selection line GSL1, GSL2, ..., GSLk connected to each gate of each second selection transistor ST21, ST22, ..., ST2$k$ embodied on each layer 61-1, 61-2, ..., 61-$k$. Accordingly, each second selection transistor ST21, ST22, ..., ST2$k$ may become turned on or off selectively. That is, through the supply of a selection signal to a first selection transistor and a second selection transistor corresponding to a string, each string 62'-1, 62'-2, . . . , 62'-k embodied on each layer 21-1, 21-2, . . . , 21-k may be selected by the row decoder 66'.

As illustrated in FIG. 4, each cell string 62'-1, 62'-2, . . . , 62'-k may share a plurality of word lines WL1 to WLn, a common source line CSL and each bit line BL1 to BLm. That is, each cell string embodied in a corresponding location on each layer 61-1 to 61-k may be connected to each page buffer 72-1, 72-2, . . . , 72-m embodied in the page register & sense amplifier 72.

Figure 5A:
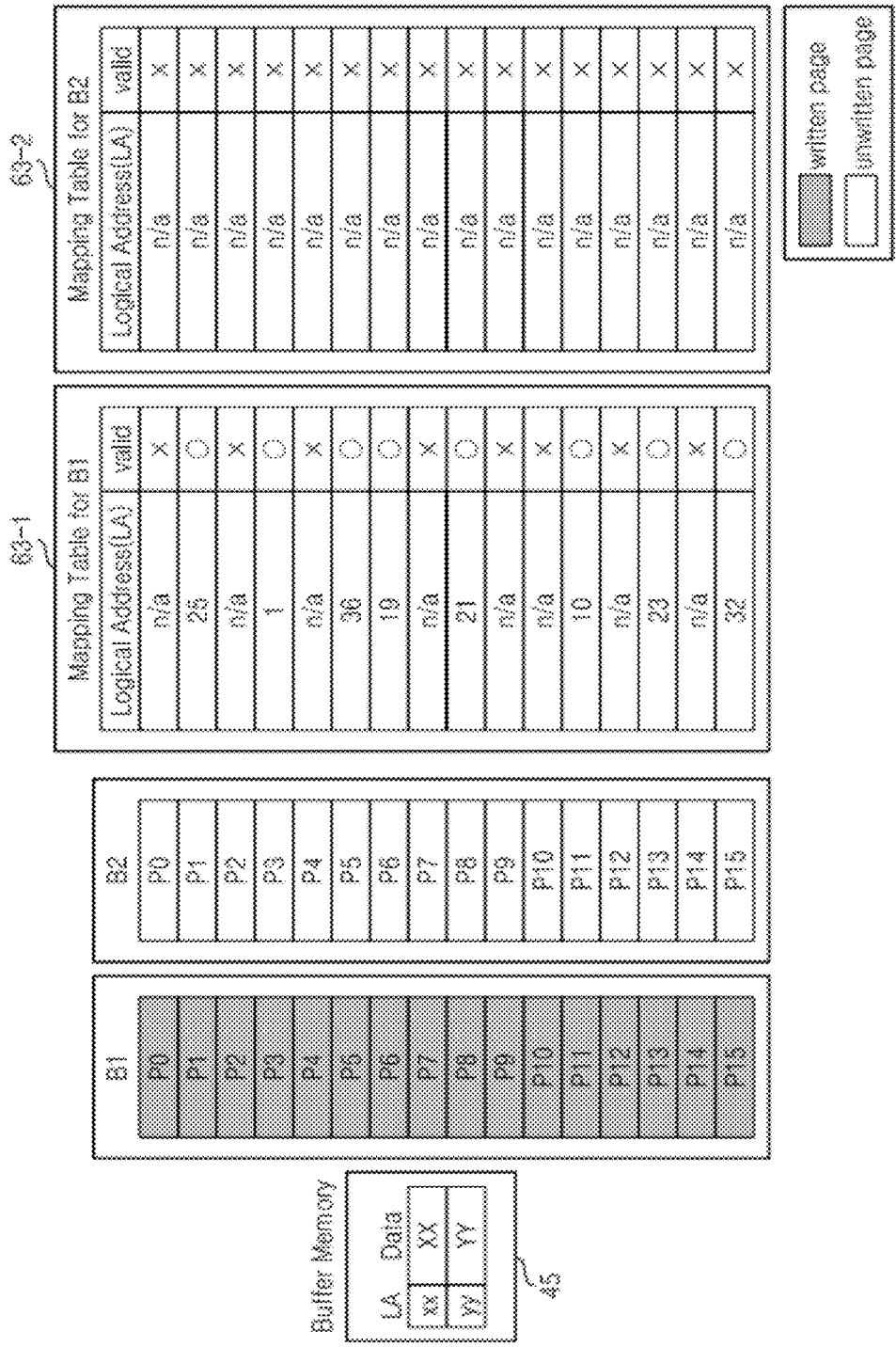
FIG. 5A depicts blocks and a mapping table before a garbage collection process according to an example embodiment.
Figure 5B:
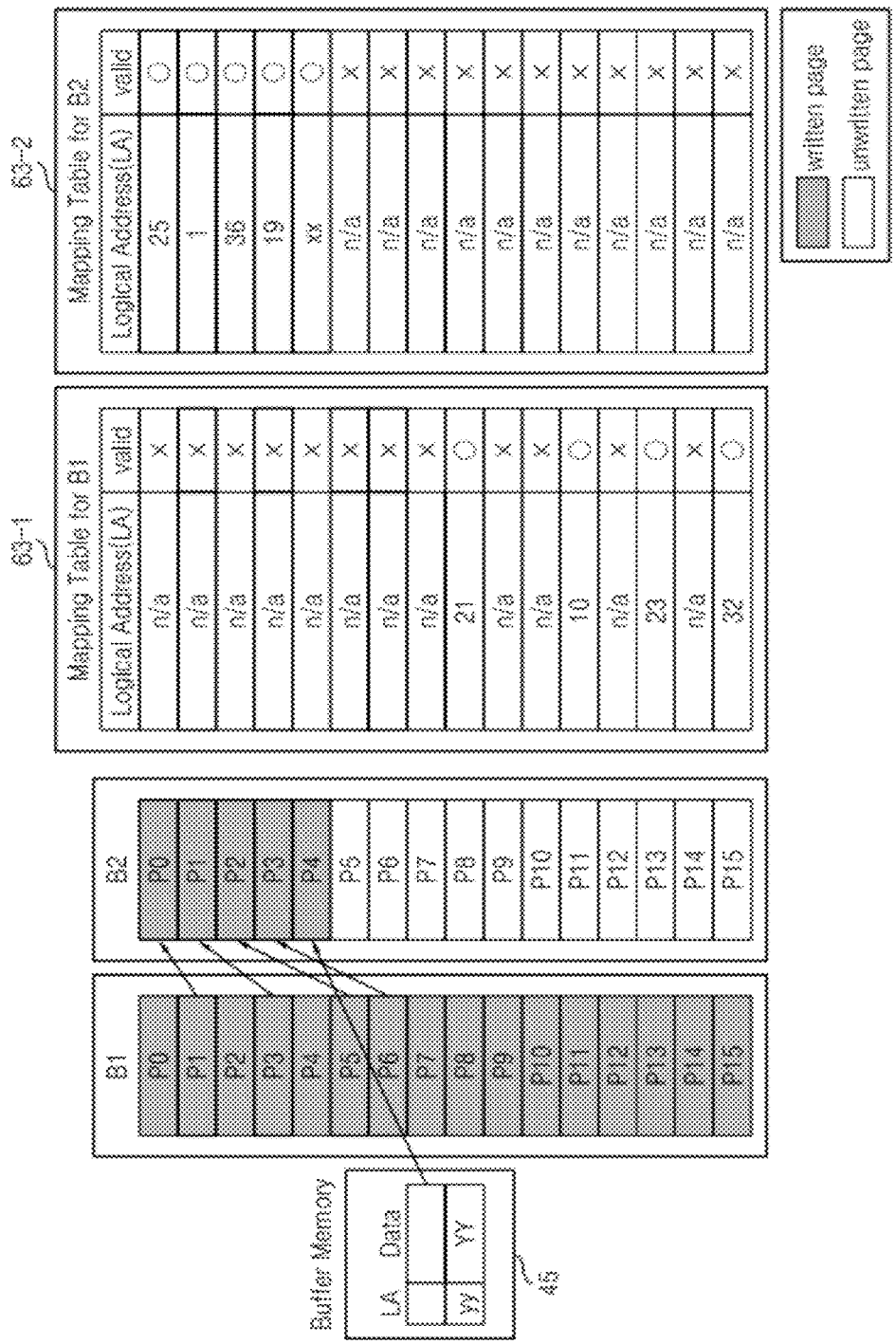
FIG. 5B depicts blocks and a mapping table during a garbage collection process according to an example embodiment.
Figure 5C:
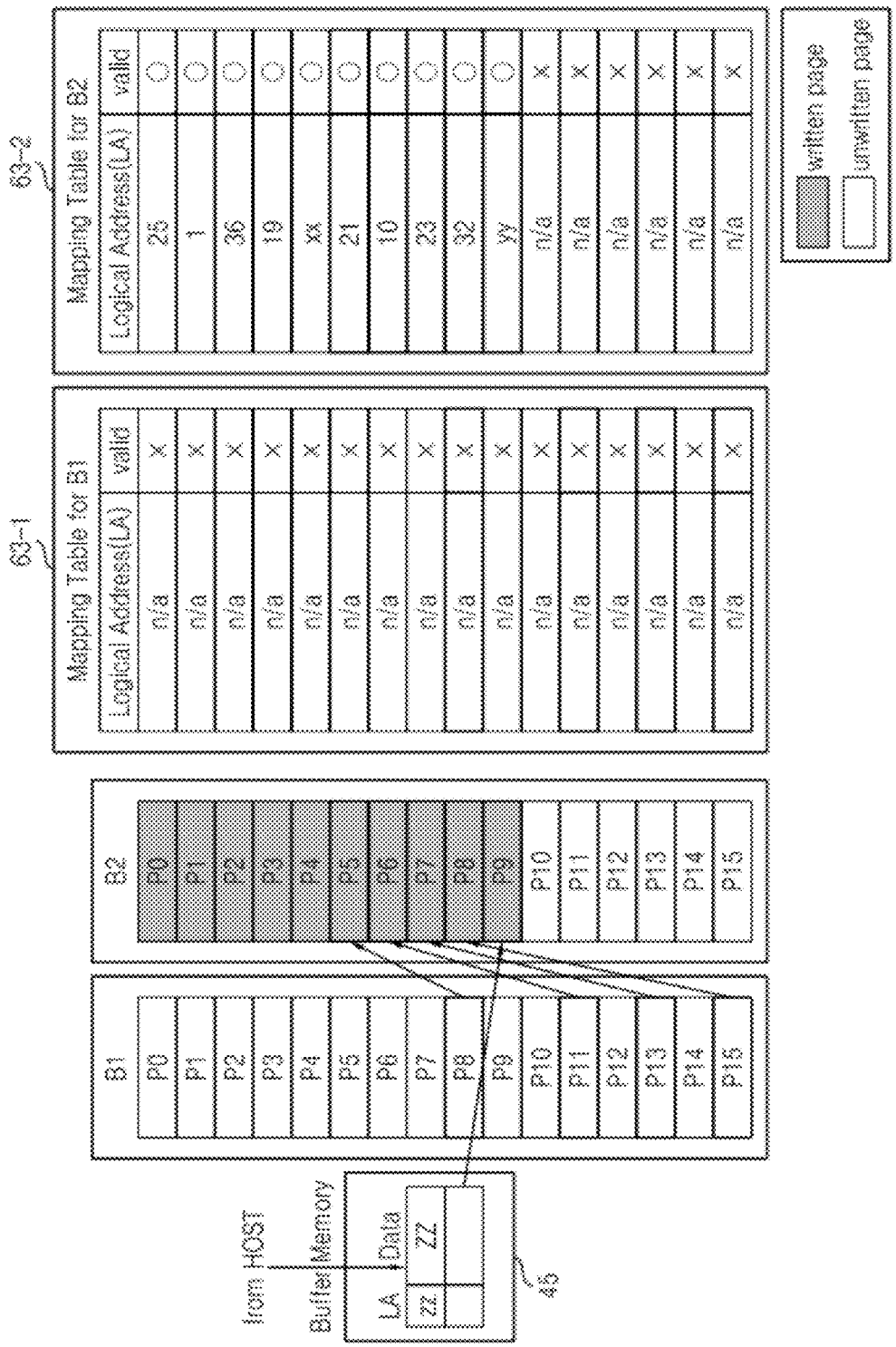
FIG. 5C depicts blocks and a mapping table after a garbage collection process according to an example embodiment.

FIGS. 5A through 5C depict an exemplary operation of the flash memory 60, where data may be written to the flash memory during a garbage collection process. In one embodiment, a cell string 62'-1 embodied on a layer, e.g., a first layer 61-1, among a plurality of layers 61-1 to 61-k may be selected by the row decoder 66'. In this exemplary method, the WAF is 1 and each garbage collection operation processes 4 pages of valid data. The exemplary process portrayed in FIGS. 5A though 5C is similar to the exemplary method set forth in FIG. 2.

In one embodiment, a memory cell array 62 may refer to a two dimensional memory cell array 62 illustrated in FIG. 3 or a three dimensional memory cell array 62' illustrated in FIG. 4 generally. A row decoder 66 may generally refer to the row decoder 66 illustrated in FIG. 3 or the row decoder 66' illustrated in FIG. 4.

FIG. 5A depicts two blocks B1 and B2 and two corresponding mapping tables (Mapping Table for B1 63-1; Mapping Table for B2 63-2) before garbage collection according to an example embodiment. Referring to FIGS. 1, 3 and 5A, a memory cell array 62 may include a plurality of blocks, e.g., B1 and B2. Each of the plurality of blocks B1 and B2 may include 16 pages P0 to P15. According to an example embodiment, each of the plurality of blocks may include 8, 32 or more pages. The number of pages in the block is not limited to these examples.

In an embodiment depicted in FIGS. 5A to 5C, blocks B1 and B2 each include 16 pages. In one embodiment, each page of the block may use one or more bits to indicate whether the page includes any data or not. In another embodiment, the block may use one or more bits to indicate whether each page includes data. An indication of pages that include data is shown in FIG. 5A by a page in a block being shaded. A page that is not shaded does not include any data. A page that is shaded includes data, which may be valid data or invalid data.

Each mapping table may store a logical address for each page of data in a block as well as a marker that indicates whether the page includes valid data. Each page is marked as including valid data or invalid data. In one embodiment, one or more bits in each page of a block may be used as a validity marker, to indicate whether the page includes valid data or invalid data. In another embodiment, one or more bits in each block may be used as a validity marker, to indicate whether each page in the block includes valid data or invalid data. All of the pages in a block may be marked in a mapping table that corresponds to the block in which the page exists. Each page with valid data is indicated with an "O" in a mapping table. Each page with invalid data or that doesn't currently store data is indicated with an 'X' on a mapping table. The 'O' and the 'X' shown in FIG. 5A may represent, for example, a '0' and '1' or other indicator bits stored in the mapping table.

In the embodiment shown in FIG. 5A, the shading in the first block B1 indicates that each of the plurality of pages P0 to P15 of the first block B1 stores data. In this embodiment, the lack of shading in the second block B2 indicates that each of the plurality of pages P0 to P15 of the second block B2 do not store data. The use of shading in FIG. 5A may represent, for example, a '0' and '1' or other indicator bits stored in the mapping table. The validity of the data in each page of blocks B1 and B2 is indicated as 'O' or 'X' on mapping tables 63-1 and 63-2 that correspond to the blocks B1 and B2 of FIG. 5A.

In one embodiment, the host HOST generates first data XX and second data YY, and allocates a first logical address xx and a second logical address yy to the first data XX and the second data YY, respectively. In one embodiment, the CPU receives a write command from the host HOST along with the first data XX and the second data YY. In response, the CPU stores the first data XX and the second data YY in the buffer memory 45 and sends a write command to the flash memory 60 to write the first and second data in the buffer memory 45 to the flash memory 60. The buffer memory 45 temporarily stores the first data XX and the second data YY corresponding to a write command of the host HOST until the first data XX and second data YY are stored in a more permanent memory (i.e. the flash memory 60). In one embodiment, the memory device 10 may refer to the first data XX and second data YY not by the first logical address xx or the second logical address yy allocated by the host HOST, but by a physical address.

The memory device 10 may convert a logical address supplied by the host HOST into a physical address inside the memory cell array 62. The conversion may be embodied in software, and the software may be called a flash translation layer FTL. The software may be stored in the buffer memory 45.

Each of a plurality of mapping tables 63-1 to 63-2 may serve as a logical-physical address conversion table. Marking a Logical Address entry of a page in a block B1 or B2 to be 'n/a' in one of the plurality of mapping tables 63-1 and 63-2 of FIG. 5A may mean that the physical address and the logical address of the marked page in the first block B1 or the second block B2 is not mapped. The logical address of a piece of data corresponds to an address that a host HOST may be able to process to understand where that piece of data is located. A logical address may be the location that a piece of data appears to reside from the perspective of the host HOST. A physical address of a piece of data corresponds to the actual physical location of that piece of data in a memory cell array.

For example, in FIG. 5A, a first mapping table 63-1 shows that a logical address LA '25' is mapped to a physical address of a first page P1 of the first block B1 and a logical address LA '1' is mapped to a physical address of a third page of the first block B1. The plurality of mapping tables 63-1 and 63-2 may be stored in the buffer memory 45.

FIG. 5B depicts the blocks B1 and B2 and the mapping tables 63-1 and 63-2 during a garbage collection process according to an example embodiment. Referring to FIGS. 1, 2, 3, 5A and 5B, the memory controller 50 may have initiated a garbage collection process to reclaim first block B1. A garbage collection operation may have already begun. In one embodiment, the garbage collection operation processes four pages of valid data at a time. Accordingly, in FIG. 5B, the first four pages of valid data (pages P1, P3, P5 and P6) of the first block B1 may be copied into the first four pages (P0, P1, P2 and P3) of the second block B2. Once this first operation is completed, the memory controller 50 may then control the flash memory 60 to write an amount of data corresponding to the WAF into the second block B2. To write data that has been stored in the buffer memory 45 to the flash memory 60, the memory controller 50 may control the flash memory 60 to copy that data from the buffer memory 45 to a page or to pages in a block in the flash memory 60. In one embodiment, the WAF is 1, so only the first data XX may be written to the next page in the second block B2 that is able to store data. Here, the first data XX may be written to the fifth page P4 of the second block B2. In another embodiment, if the garbage collection operation processed six pages of valid data at a time, the first six pages of valid data (P1, P3, P5, P6, P8 and P11) of the first block B1 may be copied into the first six pages (P0, P1, P2, P3, P4, and P5) of the second block B2, and the first data XX may be copied into the seventh page P6 of the second block B2. In another embodiment, if the WAF was 2, first data XX and second data YY may be copied into fifth page P4 and sixth page P5 respectively after the garbage collection operation. As mentioned above, the WAF and the number of pages and/or blocks that each garbage collection operation processes are not limited to the specific examples described herein.

In one embodiment, the memory controller 50 controls the flash memory 60 to update each of a first mapping table 63-1 and a second mapping table 63-2 according to the copy operation from the first block B1 to the second block B2 that copied the valid data in pages P1, P3, P5 and P6 of the first block B1 into pages P0, P1, P2 and P3 of the second block B2. For example, as valid data stored in each of the plurality of pages P1, P3, P5 and P6 of the first block B1 are copied into each of the plurality of pages P0, P1, P2 and P3 of the second block B2, a logical address 25, 1, 36 or 19, which was mapped to a physical address of the first block B1, and a logical address xx stored in the buffer memory 45, may be mapped to physical addresses of the second block B2 in which the valid data has been stored. A first mapping table 63-1 in an exemplary embodiment in FIG. 5B shows that the logical address 25, 1, 36, and 19 are no longer mapped to physical addresses of the first block B1. A second mapping table 63-2 illustrated in FIG. 5B shows that logical addresses 25, 1, 36, 19 and xx are mapped to physical addresses of the second block B2.

In one embodiment, the buffer memory 45 automatically updates after data from the buffer is written to the flash memory 60. After the first data XX was written to page P4 in the second block B2, the buffer memory 45 may have updated itself and removed the entry for that first data XX. In another embodiment, the buffer memory 45 may be updated before each garbage collection operation begins, after the garbage collection process is finished, or after all of the data in the buffer memory 45 has been written. The updating of the entries in the buffer memory 45 enables the buffer memory 45 to store more write data and have that additional write data written during garbage collection, speeding the writing process during garbage collection.

In the embodiment of FIG. 5B, since there is still valid data that has not been copied in the first block B1 after the first data XX has been written to the second block B2, the garbage collection process may not be completed. In addition, since there is still data to be written in the memory buffer 45, the write operation may not be completed.

FIG. 5C depicts blocks and a mapping table after a garbage collection process according to an example embodiment. Referring to FIGS. 1, 2, 3, 5A, 5B, and 5C, after a first garbage collection operation which copied a first four pages of valid data stored in the first block B1 into the second block B2 and a write operation that wrote the first data XX stored in the buffer memory 45 to the second block B2, the memory controller 50 may control the flash memory 60 to perform another garbage collection operation, copying the next four pages of valid data (pages P8, P11, P13 and P15) from the first block B1 into the next four available pages (P5, P6, P7 and P8) in the second block B2. Since more data to be written remains in the buffer memory 45, the memory controller 50 may then control the flash memory 60 to copy the second data YY (in accordance with the WAF of 1) from the buffer memory 45 into the next available page (P9) in the second block B1.

Similarly, the memory controller 50 may control the flash memory 60 to update the first mapping table 63-1 and the second mapping table 63-2 according to the second copy operation from the first block B1 into the second block B2. For example, as valid data stored in each of the plurality of pages P8, P11, P13 and P15 of the first block B1 are copied into each of the plurality of pages P5, P6, P7 and P8 of the second block B2, a logical address 21, 10, 23 and 32 mapped to a physical address of the first block B1 and a logical address yy stored in the buffer memory 45 may be mapped to physical addresses of the second block B2. A first mapping table 63-1 in an exemplary embodiment in FIG. 5C shows that the logical address 21, 10, 23, and 32 are no longer mapped to physical addresses of the first block B1. A second mapping table 63-2 illustrated in FIG. 5C shows logical addresses 21, 10, 23, 10 and yy may be mapped to physical addresses of the second block B2 in which the rest of the plurality of valid data from block B1 has been stored.

In one embodiment, the memory device 10 may receive new data from the host HOST that it stores in the buffer memory 45 in the middle of its garbage collection process. This new data may be third data ZZ, with a logical address zz corresponding to the third data ZZ. In one embodiment, the buffer memory 45 is able to store the third data ZZ and the logical address zz because the buffer memory 45 automatically updates itself after data stored in the buffer memory 45 is written to the flash memory 60. The embodiments described above relating to the updating of the buffer memory 45 may be used interchangeably, as well as other embodiments not described herein, to generate more room in the buffer memory 45 for write data from the host HOST.

If the memory device 10 receives more data from the host HOST to write during or after a garbage collection process, the memory device may not have to wait to clear its buffer memory 45 by copying the contents of the buffer memory 45 to a block in the memory cell array. Rather, the data in the buffer memory 45 may be copied into the flash memory 60 while a garbage collection process is performed. A write delay may not be generated by performing a garbage collection process. Accordingly, a write performance of the flash memory 60 may become improved. In one embodiment, when the garbage collection process is completed, the first block B1 may be erased. With the erasure of the first block, the number of writable pages increases. Garbage collection may free up new space (newly erased blocks) in the memory to write new data.

In the embodiments depicted in FIGS. 5A to 5C, if the WAF is greater than the number of pages in the second block that are able to store data, the garbage collection process may be terminated so that the write data corresponding to the write command from the host HOST may be written to the flash memory 60. In another embodiment, the memory controller 50 may reduce the WAF to correspond to the number of free pages in the second block.

FIG. 6 is a flowchart displaying an exemplary operation method of the memory controller illustrated in FIG. 1 in accordance with the embodiment set forth in FIGS. 5A to 5C, when the memory controller 50 receives a write command from the CPU 30 to write data during garbage collection. The memory controller 50 may have controlled the flash memory 60 to begin a garbage collection process when it receives the write command from the CPU 30. Also, the CPU may have written a first data XX and a second data YY into the buffer memory 45.

Referring to FIGS. 1, 2, 5A, 5B, 5C and 6, the memory controller 50 performs a garbage collection operation in step S10. In one embodiment, the garbage collection operation processes four pages of valid data at a time. In this step, a first four pages of valid data from a victim block B1 in the flash memory 60 are copied to four empty pages of a free block B2 in the flash memory 60. After the garbage collection operation, the memory controller may control the flash memory 60 to copy an amount of data from the buffer memory 45 to free block B2 in the flash memory 60 in step S20. Since the WAF is 1 in this embodiment, in this step, the first data XX may be copied into the next page of the free block B2 in the flash memory 60 that is able to store data (e.g. the fifth page P4). In step S30, the memory controller then updates the mapping tables for the victim block and the free block. In step S40, if garbage collection is not completed, the memory controller 50 then performs another garbage collection operation. In this step, the memory controller 50 controls the flash memory 60 to copy the next four valid pages of data from the victim block B1 to the free block B2. In one embodiment, after these valid pages are copied, no more valid pages exist in victim block B1. In step S50, if write data remains to be written to the flash memory 60, the memory controller 50 then controls the flash memory 60 to copy a next amount of data from the buffer memory 45 in accordance with the WAF. As mentioned above, the WAF in this embodiment is 1, so the second data YY is copied into the ninth page of the free block B2 of the flash memory 60. In one embodiment, when all of the pages with valid data have been copied from the victim block B1 to the free block B2, no more garbage collection operations are needed. In step S60, the memory controller 50 may reclaim the victim block B1. In one embodiment, reclaiming the victim block B1 can include erasing the victim block B1. Other embodiments of reclamation used in flash memory are also acceptable. In one embodiment, the order of steps S50 and S60 are interchangeable, with step S60 completed before step S50 is performed. In one embodiment where S60 is performed before S50, all of the remaining data in the buffer memory 45 may be written to the flash memory 60 instead of only an amount of data in accordance with the WAF (not shown).

Figure 7:
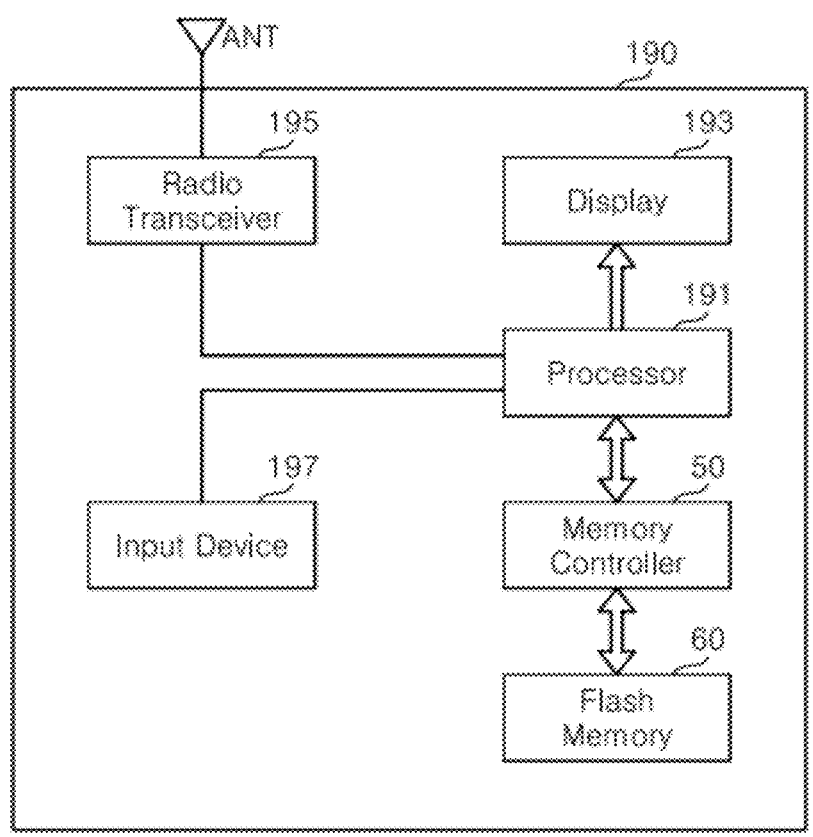
FIG. 7 depicts an example embodiment of an electronic device including the memory controller illustrated in FIG. 1.

FIG. 7 depicts an example embodiment of an electronic device that includes the memory controller illustrated in FIG. 1. Referring to FIG. 7, an electronic device 190 which may be embodied in a cellular phone, a smart phone or a wireless Internet device may include the flash memory 60 and a memory controller 50 that controls an operation of the flash memory 60. The memory controller 50 may be controlled by a processor 91 that controls a general operation of the electronic device 190. The memory controller 50 may help write new data during garbage collection under a control of the processor 191.

Data stored in the flash memory 60 may be displayed through a display 193 under a control of the processor 191. A radio transceiver 195 may transmit or receive radio signals through an antenna ANT. For example, the radio transceiver 195 may convert radio signals received through the antenna ANT into signals which the processor 191 may process. Accordingly, the processor 191 may process signals output from the radio transceiver 195 and store processed signals in the flash memory 60 or display them through the display 193. The radio transceiver 195 may also convert signals output from the processor 191 into radio signals and output converted radio signals to outside through the antenna ANT.

An input device 197 may be embodied in a pointing device such as a touch pad, a computer mouse, a keypad and/or a keyboard as a device which may input control signals for controlling an operation of the processor 191 or input data to be processed by the processor 191.

The processor 191 may control an operation of the display 193 so that data output from the flash memory 60, radio signals output from the radio transceiver 195, or data output from the input device 197 may be displayed through the display 193.

Figure 8:
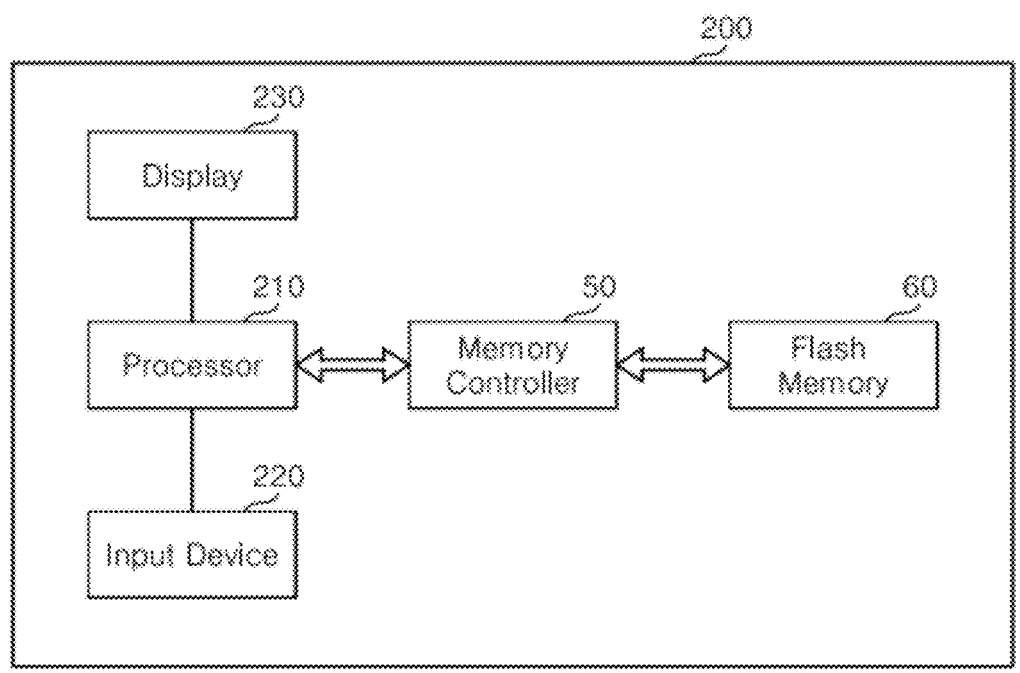
FIG. 8 depicts another example embodiment of an electronic device including the memory controller illustrated in FIG. 1.

FIG. 8 depicts another example embodiment of an electronic device that includes the memory controller illustrated in FIG. 1. Referring to FIG. 8, an electronic device 200 which may be embodied in a data processing device such as a personal computer (PC), a tablet computer, a net book, an e-reader, a personal digital assistant (PDA), a portable multimedia player (PMP), a MP3 player or a MP4 player may include the flash memory 60 and a memory controller 50 that controls an operation of the flash memory 60.

Moreover, the electronic device 200 may include a processor 210 for controlling a general operation of the electronic device 200. The memory controller 50 may be controlled by the processor 210. For example, the memory controller 50 may help write new data during garbage collection under a control of the processor 210.

The processor 210 may display data stored in the flash memory 60 through the display 230 according to an input signal generated by an input device 220. For example, the input device 220 may be embodied in a pointing device such as a touch pad, a computer mouse, a keypad and/or a keyboard.

Figure 9:
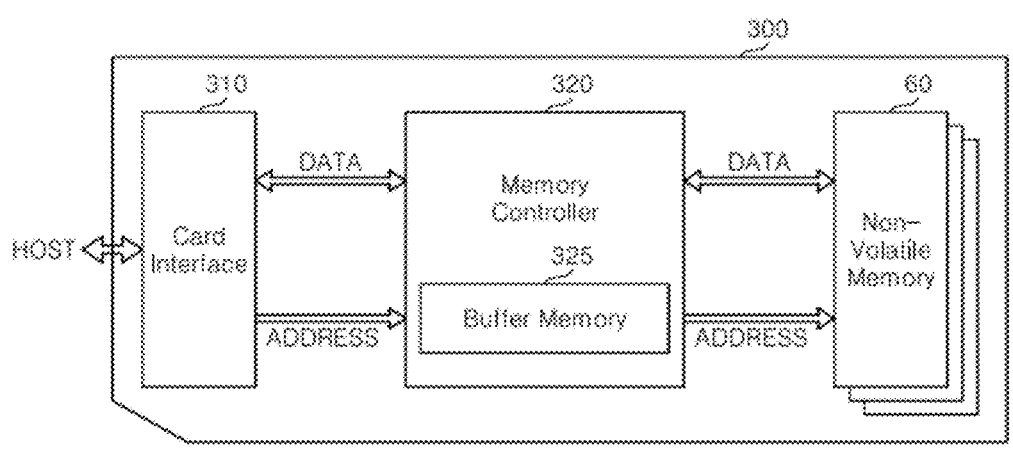
FIG. 9 depicts still another example embodiment of an electronic device including the memory controller illustrated in FIG. 1.

FIG. 9 depicts still another example embodiment of an electronic device that includes a memory controller. Referring to FIG. 9, an electronic device 300 may include a card interface 310, a memory controller 320, and at least a non-volatile memory 60, e.g., a flash memory.

The electronic device 300 may transmit or receive data with a host HOST through a card interface 310. According to an example embodiment, the card interface 310 may be a secure digital (SD) care interface or a multi-media card (MMC) interface; however, it is not restricted thereto. The card interface 310 may interface data exchange between the host HOST and the memory controller 320 in accordance with a communication protocol of the host HOST.

The memory controller 320 may control a general operation of the electronic device 300 and may control data exchange between the card interface 310 and the non-volatile memory device 60. A buffer memory 325 of the memory controller 320 may also buffer data transmitted or received between the card interface 310 and the non-volatile memory device 60.

The memory controller 320 may be connected to the card interface 310 and the non-volatile memory device 60 through a data bus DATA and an address bus ADDRESS. According to an example embodiment, the memory controller 320 may receive an address of data to read or write from the card interface 310 through the address bus ADDRESS and transmit it to the non-volatile memory 60.

The memory controller 320 may receive or transmit data to read or write through the data bus DATA connected to the card interface 310 and to the non-volatile memory 60. According to an example embodiment, the memory controller 320 may perform an identical or similar function to the memory controller 50 illustrated in FIG. 1. Accordingly, the memory controller 320 may help write new data during garage collection.

When the electronic device 300 of FIG. 9 is connected to a host HOST, such as a computer, a digital camera, a digital audio player, a cellular phone, console video game hardware or a digital set top box, the host HOST may transmit or receive data stored in at least a non-volatile memory 60 through the card interface 310 and the memory controller 320.

Figure 10:
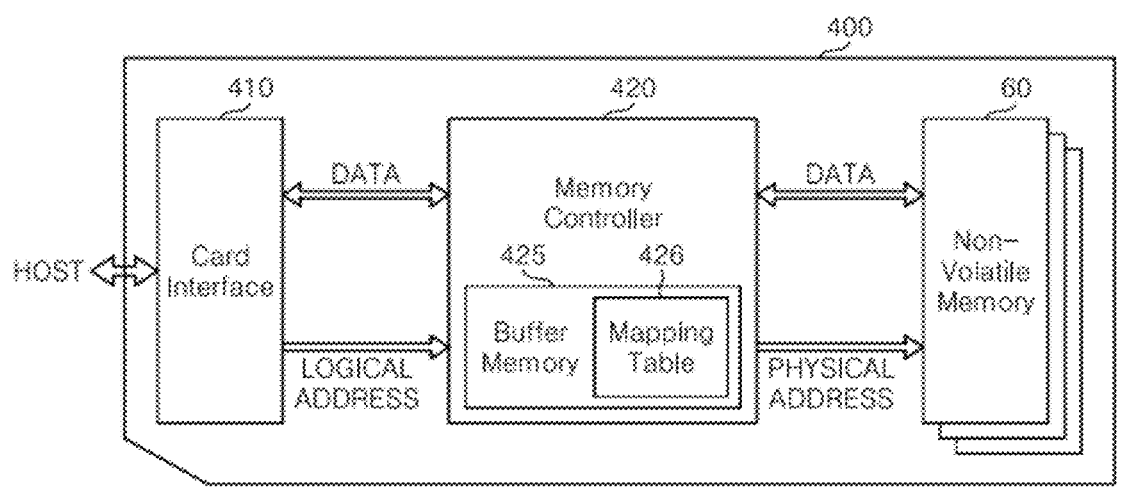
FIG. 10 depicts still another example embodiment of an electronic device including the memory controller illustrated in FIG. 1.

FIG. 10 depicts still another example embodiment of an electronic device. Referring to FIG. 10, an electronic device 400 may include a card interface 410 a memory controller 420, and at least a non-volatile memory 60, e.g., a flash memory.

The electronic device 400 may perform data communication with a host HOST through the card interface 410. According to an example embodiment, a card interface 410 may be a secure digital (SD) card interface or a multi-media card (MMC) interface; however, it is not restricted thereto. The card interface 410 may perform data communication between the host HOST and the memory controller 420 in accordance with a communication protocol of the host HOST.

The memory controller 420 may control a general operation of the electronic device 400 and may control data exchange between the card interface 410 and at least a non-volatile memory device 60. Many kinds of data can be stored in at least a non-volatile memory 60. Buffer memory 425 included in the memory controller 420 may store different kinds of data to control a general operation of the electronic device 400. The memory controller 420 may be connected to the card interface 410 and the non-volatile memory device 60 through a data bus DATA and a logical address bus LOGICAL ADDRESS. According to an example embodiment, the memory controller 420 may receive an address of data to read or write from the card interface 410 through a logical address bus LOGICAL ADDRESS and transmit it to the non-volatile memory 60 through a physical address bus PHYSICAL ADDRESS.

In addition, the memory controller 420 may receive or transmit data to read or write through a data bus DATA connected to the card interface 410 and to the non-volatile memory 60. In one embodiment, the memory controller 420 may perform an identical or similar function to the memory controller 50 illustrated in FIG. 1. Accordingly, the memory controller 420 may help write new data during garbage collection.

According to an example embodiment, the memory controller 420 of the electronic device 400 may include a mapping table 426 inside the buffer memory 425. The mapping table 426 may include a logical address input from an external source such as the host HOST and a logical address for accessing the non-volatile memory 60. During a write operation, the memory controller 420 may write new data on an arbitrary physical address and update the mapping table 426.

When the electronic device 400 of FIG. 10 is connected to a host HOST such as a computer, a digital camera, a digital audio player, a cellular phone, console video game hardware or a digital set top box, the host HOST may transmit or receive data stored in at least a non-volatile memory 60 through the card interface 410 and the memory controller 420.

Figure 11:
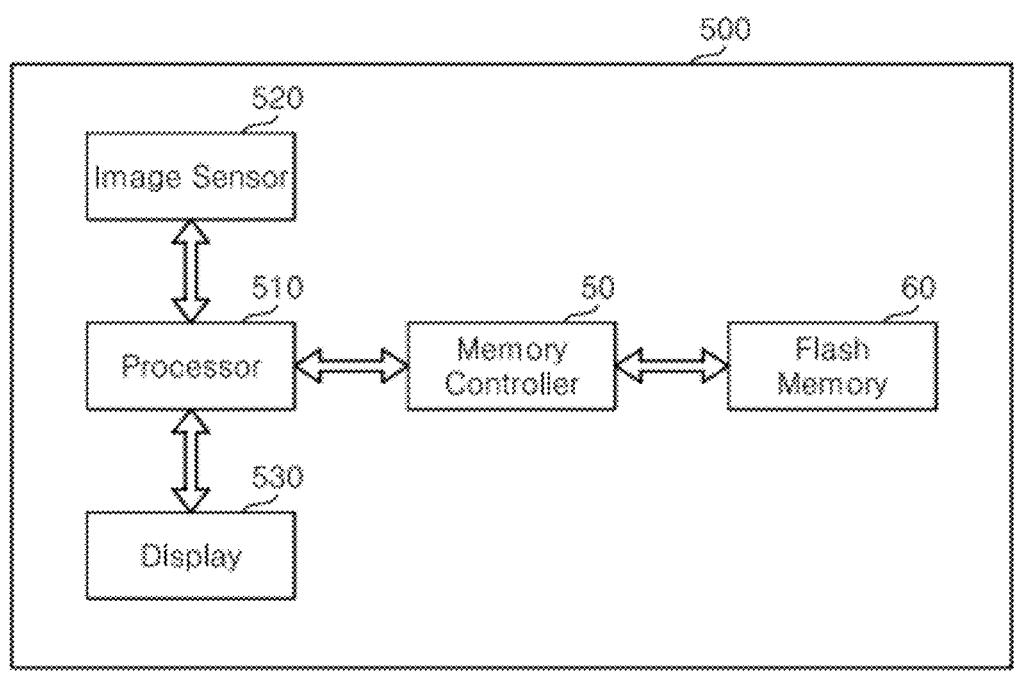
FIG. 11 depicts still another example embodiment of an electronic device including the memory controller illustrated in FIG. 1.

FIG. 11 depicts still another example embodiment of an electronic device that includes the memory controller illustrated in FIG. 1. Referring to FIG. 11, an electronic device 500 may include a flash memory 60, a memory controller 50 for controlling a data processing operation of the flash memory 60, and a processor 510 for controlling a general operation of the electronic device 500. The memory controller 50 may help write new data during garbage collection under a control of the processor 510.

An image sensor 520 of the electronic device 500 may convert an optical image into digital signals. Converted digital signals may be stored in the flash memory 60 or displayed through a display 530 under a control of the processor 510. The digital signals stored in the flash memory 60 may be displayed through the display 530 under a control of the processor 510.

Figure 12:
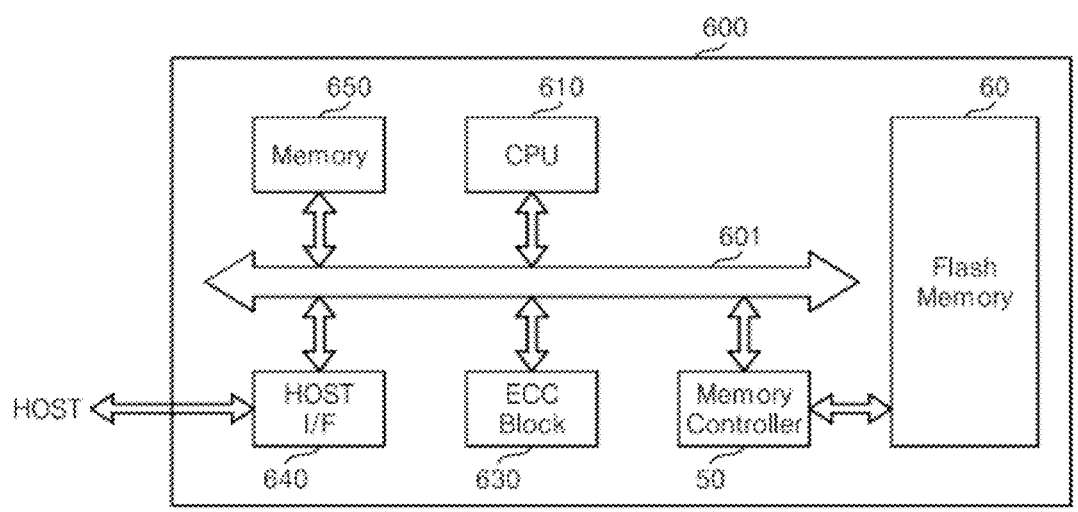
FIG. 12 depicts still another example embodiment of an electronic device including the memory controller illustrated in FIG. 1.

FIG. 12 depicts still another example embodiment of an electronic device that includes the flash memory illustrated in FIG. 1. Referring to FIG. 12, an electronic device 600 may include a flash memory 60, a memory controller 50 for controlling an operation of the flash memory 60, and a CPU 610 that controls a general operation of the electronic device 600.

The electronic device 600 may include a memory 650 which may be used as an operation memory of the CPU 610. The memory 650 may be embodied in a non-volatile memory like ROM or a volatile memory like DRAM. A host HOST connected to the electronic device 600 may transmit or receive data with the flash memory 60 through the memory controller 50 and a host interface 640. In one embodiment, the memory controller 50 may function as a memory interface, e.g., as a flash memory interface. The memory controller 50 may help write new data during garbage collection under a control of the CPU 610.

An error correction code ECC block 630 that operates under a control of the CPU 610 may detect and correct an error included in data read by the memory device 60 through the memory controller 50. The CPU 610 may control data exchange among the memory controller 50, the ECC block 630, the host interface 640, and a memory device 650 through a bus 601. The electronic device 600 may be embodied in a universal serial bus (USB) memory drive or a memory stick, but is not restricted thereto.

Figure 13:
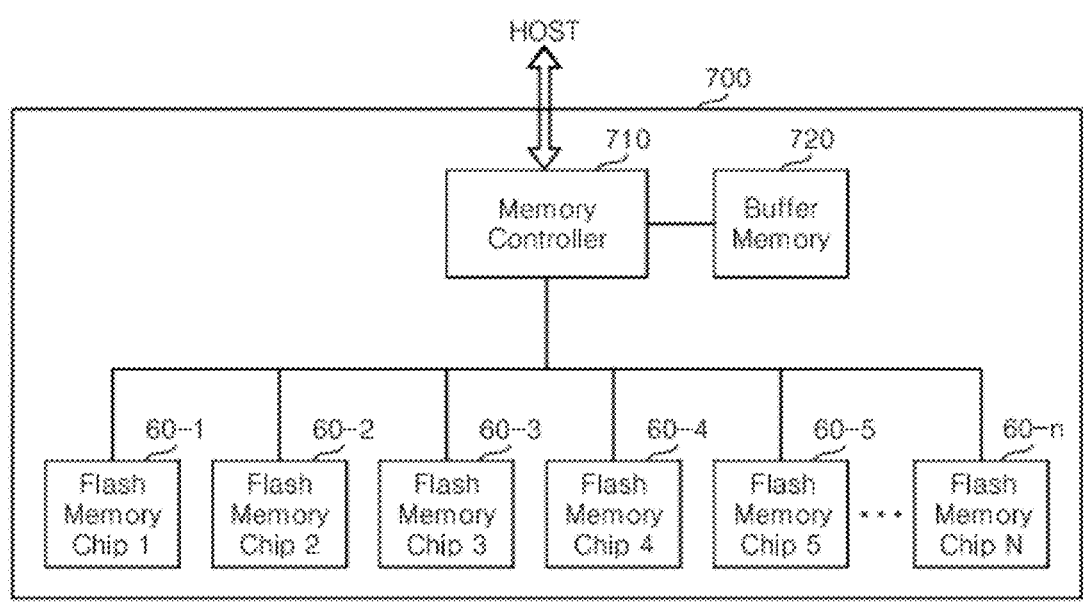
FIG. 13 depicts still another example embodiment of an electronic device including the memory controller illustrated in FIG. 1.

FIG. 13 depicts still another example embodiment of an electronic device. Referring to FIG. 13, an electronic device 700 may be embodied in a data storage device like a solid state drive (SSD). The electronic device 700 may include a plurality of flash memory chips 60-1 to 60-n and a memory controller 710 that controls each data processing operation of the plurality of flash memory chips 60-1 to 60-n. A memory controller 710 may include a buffer memory 720. The buffer memory 720 may store data corresponding to a write command of a host HOST.

The electronic device 700 may be embodied in a memory system or a memory module. According to an example embodiment, the memory controller 710 may be embodied inside or outside the electronic device 700 and may be embodied in a plurality of memory controllers.

Figure 14:
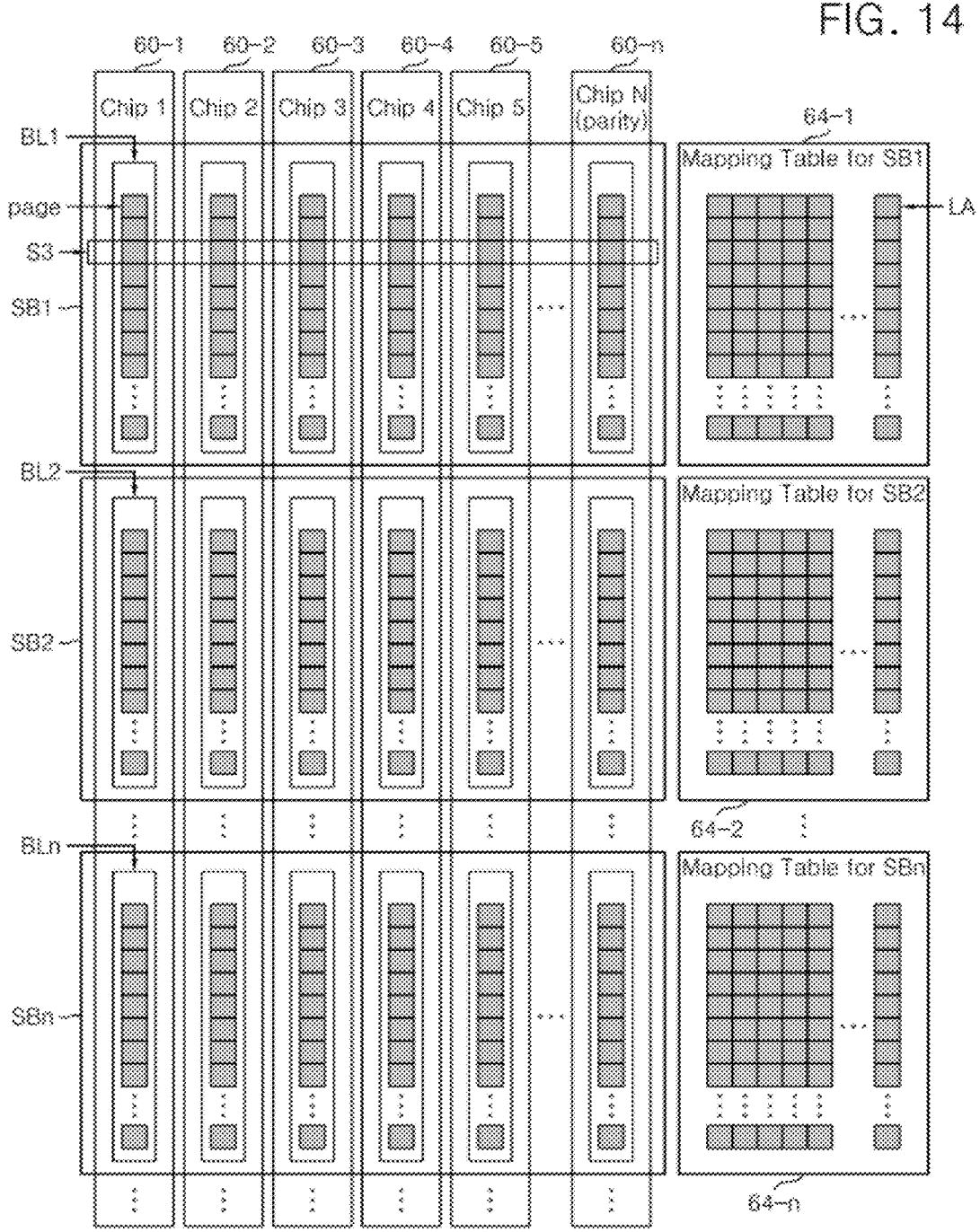
FIG. 14 is a block diagram displaying an exemplary schematic configuration of a memory cell array embodied in a plurality of flash memory chips illustrated in FIG. 13 and a mapping table.

FIG. 14 is a block diagram displaying an exemplary schematic configuration of a memory cell array embodied in the plurality of flash memory chips illustrated in FIG. 13 along with a plurality of mapping tables that correspond to the memory cell array. Referring to embodiments depicted in FIGS. 13 and 14, when the electronic device 700 is embodied in a memory system, the electronic device 700 may include a plurality of memory chips 60-1 to 60-n. A memory array embodied in each of the plurality of memory chips 60-1 to 60-n may include a plurality of blocks BL1 to BLn. Each of the plurality of blocks BL1 to BLn may be divided into a plurality of pages. According to an example embodiment, parity for detecting an error may be stored in one page of each of the plurality of memory chips 60-1 to 60-n.

A memory array embodied in each of the plurality of memory chips 60-1 to 60-n may be divided into a plurality of stripe blocks SB1 to SBn, where each of the plurality of stripe blocks SB1 to SBn may include a plurality of stripes.

In one embodiment, a stripe is a segment of logically sequential data that may be stored across different physical storage devices. For example, a segment of logically sequential data may be stored across a plurality of memory chips 60-1 to 60-n such that the first page of the first block of each chip stores the logically sequential segment of data. In one embodiment, a logically sequential data segment that may be stored across n pages may be stored in the first page of the first block in each of the memory chips 60-1 to 60-n. The data may similarly be accessed, segment by segment, by accessing the first page of the first block of each of the plurality of memory chips 60-1 to 60-n in order. Data striping may enable faster data access throughput by allowing a processing device to access data from different physical storage devices concurrently.

In one embodiment, a stripe may be defined as a combination of an $N^{th}$ page, where N is a positive integer, embodied in each memory cell array of an Nth block across the plurality of memory chips 60-1 to 60-n. For example, a third stripe S3 in FIG. 3 is a combination of a third page embodied in each memory cell array of the first block across the plurality of memory chips 60-1 to 60-n.

A buffer memory 720 may include a plurality of mapping tables 64-1 to 64-n. Each mapping table 64-1 to 64-n may include a logical-physical address conversion table for each page in a stripe block of a memory array embodied in the plurality of memory chips 60-1 to 60-n. In another embodiment, each memory chip 60-1 to 60-n may store a mapping table 64-1 to 64-n that corresponds to the chip in which the mapping table resides.

In one embodiment, a parity is stored in one page of each stripe, e.g., page 1 of memory chip 60-n for the first stripe S1, across the plurality of memory chips 60-1 to 60-n. In one embodiment, a parity is a set of one or more bits that stores information relating to the accuracy of data in a particular stripe, and a parity is stored in one page of a stripe. In another embodiment, a parity stores information relating to the accuracy of data in one or more stripes. In one embodiment, when a page or memory location stores a parity, a mapping table should not map between a physical address and a logical address for that page or memory location.

In one embodiment, the host HOST may send the memory controller 710 a WAF when it sends a write command and write data to the memory controller 710. In one embodiment, a WAF (write amplification factor) may be stored in the buffer memory 720. In another embodiment, a WAF may be stored in one or more of the memory chips 60-1 to 60-n.

Figure 15:
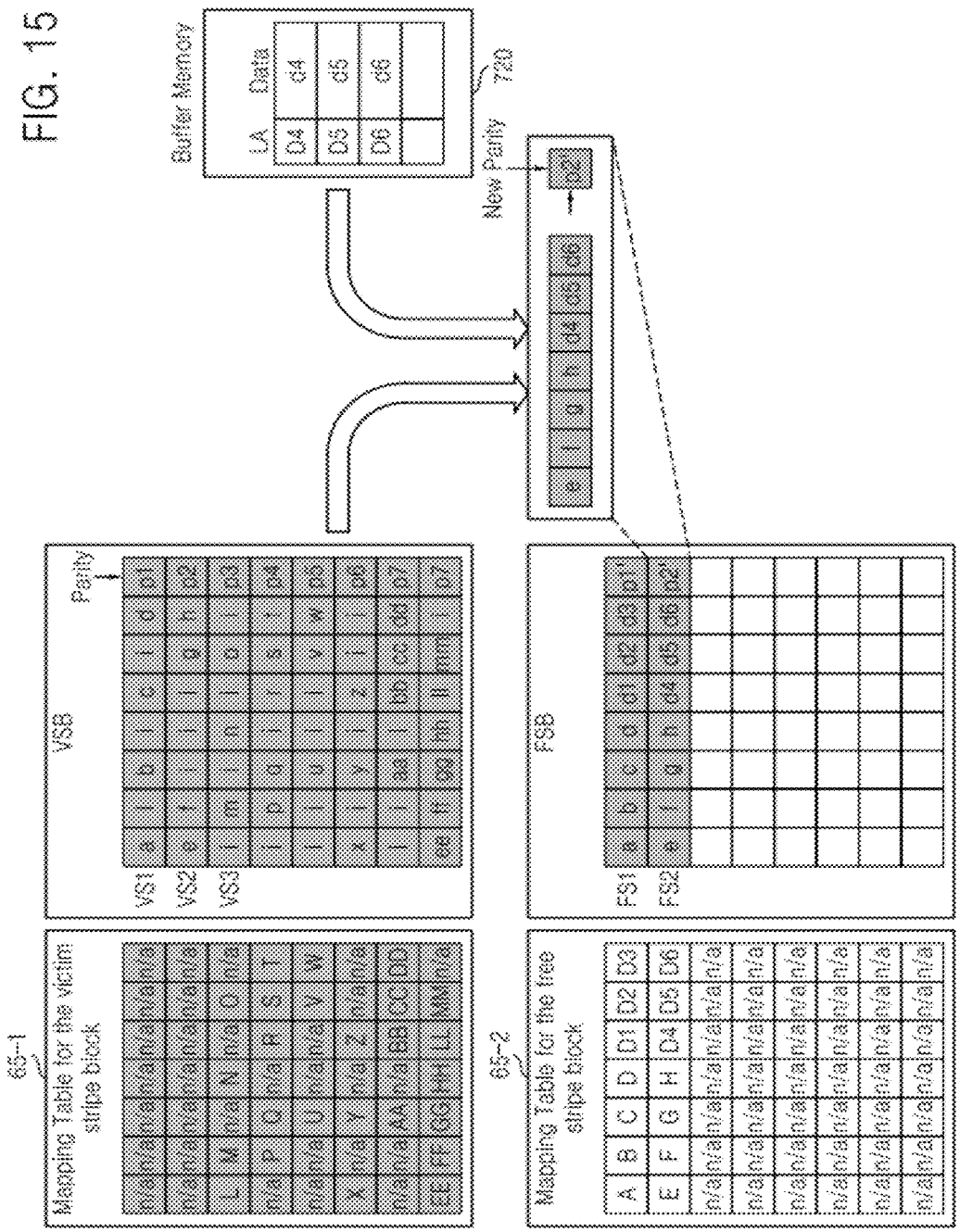
FIG. 15 is a block diagram displaying a plurality of stripe blocks and a buffer memory during a garbage collection process according to an example embodiment.

FIG. 15 is an exemplary block diagram displaying a victim stripe block VSB, a free stripe block FSB, mapping tables for each of the stripe blocks, and a buffer memory. Referring to FIGS. 13 to 15, victim stripe block VSB is a stripe block that may be an object of a garbage collection process. Victim stripe block VSB may be one of a plurality of stripe blocks SB1 to SBn illustrated in FIG. 14.

In one embodiment, each page in the victim stripe block VSB stores valid data or invalid data. In one embodiment, marking a Logical Address entry of a page in a mapping table for a stripe block as 'n/a' means that a physical address and a logical address of the page in the stripe is not mapped. In one embodiment, marking the Logical Address entry of a page in a mapping table for a stripe block as 'n/a' means that the data at the corresponding physical address is invalid or that no data exists at the corresponding physical address. If the Logical Address entry of a page in a mapping table for a stripe block includes any marking other than an 'n/a', that may mean that a physical address and a logical address of that page is mapped, and valid data exists at the physical address corresponding to that Logical Address entry.

In the mapping table 65-1 for the victim stripe block VSB, a Logical Address entry for a page marked as 'n/a' means that a physical address and a logical address of the page in the victim stripe block VSB are not mapped, and a Logical Address entry for a page marked with any marking other than 'n/a' (i.e. other letters) means that a physical address and a logical address of the page in the victim stripe block VSB are mapped. For example, a letter of 1' in a Logical Address entry for a page of the mapping table 65-1 for the victim stripe block VSB may indicate that the logical address 1' is mapped to a physical address of a first page in the first memory chip 60-1 of the third stripe VS3 in the victim stripe block VSB.

A free stripe block FSB may be a stripe block that initially does not include any data and that is marked to receive the valid data from the victim stripe block VSB during garbage collection. The free stripe block FSB may be one of the plurality of stripe blocks SB1 to SBn illustrated in FIG. 14. In one embodiment, the free stripe block FSB may be an erased stripe block. In another embodiment, the free stripe block FSB may be a block that has never had data written into it. In one embodiment, the electronic device 700 may include 8 flash memory chips, 60-1 to 60-n. Each stripe of the victim stripe block VSB and of the free stripe block FSB may include 8 pages. In one embodiment, the last page of each stripe may include a parity bit that is used for error correction. The generation and use of the parity bit is discussed further below.

In one embodiment of a garbage collection process, a memory controller 710 controls valid data written in the victim stripe block VSB to be copied from the victim stripe block VSB into the free stripe block FSB. In one embodiment, a garbage collection operation processes one stripe of data from the victim stripe block VSB.

Referring to FIG. 15, in one embodiment of a garbage collection operation where the operation processes one stripe of data, each page of valid data stored in a first stripe VS1 of the victim stripe block VSB may be copied into pages of the first stripe FS1 of the free stripe block FSB. In the embodiment depicted in FIG. 15, the first stripe VS1 of the victim stripe block VSB includes four pages of valid data (a, b, c, and d). In one embodiment of a garbage collection operation as depicted in FIG. 15, the memory controller 710 may control the flash memory 60 to copy the four pages of valid data (a, b, c, and d) from the first stripe VS1 of the victim stripe block VSB to the first four pages of the first stripe FS1 of the free stripe block FSB.

In one embodiment, the memory controller 710 receives a write command from the host HOST with write data. The memory controller 710 may store all of the write data in the buffer memory 720. In one embodiment, if the buffer memory 720 is unable to hold all of the write data sent by the host HOST, then the buffer memory 720 may store a portion of the write data corresponding to the write command. In this embodiment, after write data from the buffer memory 720 is written into, for example, the free stripe block FSB, the buffer memory may be updated and more write data corresponding to the write command may be stored into the buffer memory 720 until all of the write data corresponding to the write command from the host HOST has been stored in the buffer memory 720. Updating methods described above with respect to buffer memory 45 are applicable to buffer 710, but the method of updating the buffer memory 710 is not limited herein.

After the garbage collection operation is finished (all of the valid data from the first stripe VS1 of the victim stripe block VSB is copied into the first stripe FS1 of the free stripe block FSB), the memory controller may control for an amount of data according to the WAF to be copied into the first stripe FS1 of the free stripe block FSB. As mentioned above, the WAF may be received from the host HOST. The WAF may also be stored in the buffer memory 720 and/or in one or more of the memory chips 60-1 to 60-n. In one embodiment, if the WAF is greater than the amount of pages that are free to store data in the first stripe FS1 of the free stripe block FSB, the memory controller may store the amount of data in a different block, or may end the garbage collection process and may store all of the write data corresponding to the write command from the host HOST and then begin the garbage collection process. In one embodiment, if the WAF is greater than the amount of pages that are free to store data in the first stripe FS1 of the free stripe block FSB, the memory controller 710 may update the WAF to correspond to the amount of pages that are free to store data in the first stripe FS1. In one embodiment depicted in FIGS. 15 and 16, the WAF is 3. In that embodiment, three data (d1, d2 and d3) stored in the buffer memory 720 may be copied into the first stripe FS1 of the free stripe block FSB after the garbage collection operation.

In an embodiment as depicted in FIG. 15, a mapping table 65-2 for the free stripe block FSB may be updated so that a physical address of a first stripe FS1 of the free stripe block FSB where data (e.g., a, b, c, d, d1, d2 and d3) is stored and a logical address of the data may be mapped. A mapping table 65-1 for the victim stripe block VSB is updated so that a physical address of a first stripe VS1 of the victim stripe block VSB where data (e.g., a, b, c and d) is stored and a logical address of the data are no longer mapped.

The mapping table 65-2 may be updated such that the physical addresses of the first stripe FS1 of the free stripe block FSB where data (e.g., a, b, c, d, d1, d2 and d3) is stored may be mapped to the logical addresses, e.g., A, B, C, D, D1, D2 and D3 for the free stripe block FSB. The mapping table 65-1 may be updated such that the physical addresses of the first stripe VS1 of the victim stripe block VSB where data (e.g., a, b, c and d) was stored may no longer be mapped to logical addresses, e.g., A, B, C and D, for the victim stripe block VSB.

As mentioned above, each stripe in the free stripe block FSB stores a parity. According to an example embodiment, the memory controller 710 may control to generate a new parity p1' for the data to be stored in the first stripe VS1 of the free stripe block FSB. The parity p1' may be used for detecting an error. In one embodiment, the error detected may be an error indicating a problem with the copying of the data from the victim stripe VSB, the copying of data from the buffer memory 720, or both. The memory controller may generate the parity p1' by using valid data (e.g., a, b, c and d) stored in the first stripe VS1 of the victim stripe block VSB and an amount of data in accordance with the WAF (e.g., d1, d2 and d3) stored in the buffer memory 720. The memory controller 710 may store the parity p1' in a first stripe FS1 of the free stripe block FSB. In one embodiment, each stripe in the victim stripe block that includes data may store a parity bit.

According to an example embodiment, the parity p1' may be generated by performing a XOR logic operation on the valid data (e.g., a, b, c and d) stored in the first stripe VS1 of the victim stripe block VSB and an amount of data in accordance with the WAF (e.g., d1, d2 and d3) stored in the buffer memory 720 or by using a Reed-Solomon code. However, the method of generating the parity p1' is not limited to the examples described herein.

Since there is still valid data in the victim stripe block VSB, garbage collection may not be completed. Since there is still data to be written in the memory buffer 720, the write operation may not be completed. After the mapping tables are updated for the first stripes VS1 and FS1 of the victim stripe block VSB and the free stripe block FSB, another garbage collection operation is performed. In an embodiment depicted in FIG. 15, the second stripe VS2 includes four pages of valid data (e, f, g, and h) that may be copied into the second stripe FS2 of the free stripe block FSB during the garbage collection operation. Since write data remains in the buffer memory 720, an amount of write data (d4, d5, and d6) corresponding to the WAF may then be written to the second stripe FS2 of the free stripe block FSB. A parity p2' may be generated and stored in the last page of the second stripe FS2 of the free stripe block in a manner similar to that described above. Mapping tables 65-1 and 65-2 may also be updated in a manner similar to that described above. As long as valid data exists in the victim stripe block, garbage collection operations may continue. As long as write data corresponding to the write command has not yet been written to the memory chips 60-1 to 60-n, after each garbage collection operation, an amount of data in accordance with the WAF may be written to the free stripe block FSB.

Figure 16:
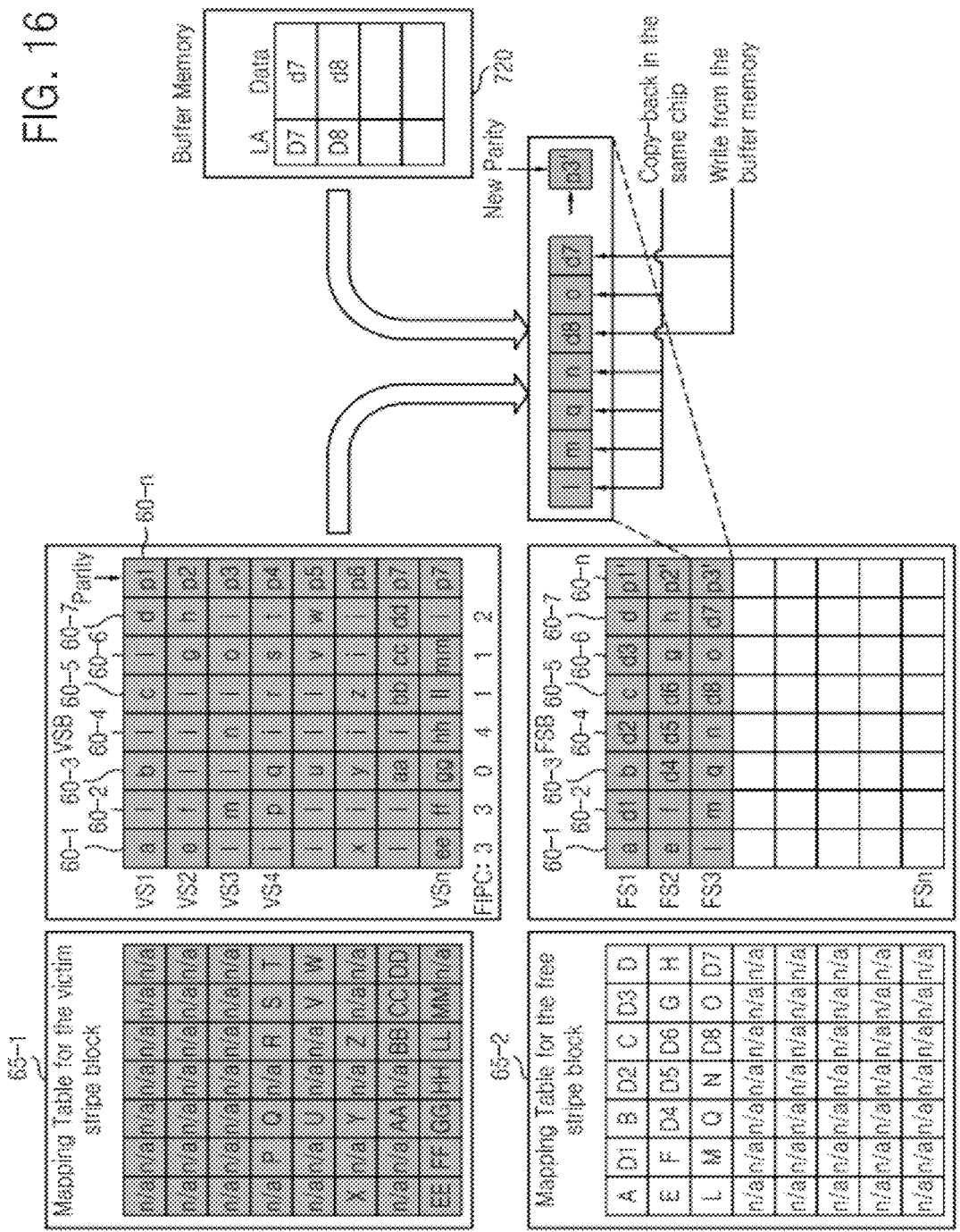
FIG. 16 is a block diagram displaying a plurality of stripe blocks and a buffer memory after a garbage collection process according to another example embodiment.

FIG. 16 is a block diagram displaying a plurality of stripe blocks, a plurality of mapping tables, and a buffer memory during an exemplary garbage collection process. In this embodiment, a garbage collection operation may process one stripe of the victim stripe block, and the WAF may be 3. The garbage collection process may be interrupted to write data in a manner similar to that described in accordance with FIG. 15, with data being written from the buffer memory 45 after each garbage collection operation, until all of the data corresponding to a write command from a host HOST has been written or a garbage collection process has been completed.

In the embodiment depicted in FIG. 16, the copying of data from the victim stripe block VSB or the buffer memory 45 to the free stripe block FSB differs from the embodiment depicted in FIG. 15. In this embodiment, a garbage collection operation may be performed on the third stripe VS3 of the victim stripe block. Referring to FIGS. 13 to 16, all of the valid data (l, m, n and o) stored in a third stripe VS3 of the victim stripe block VSB may be copied into the third stripe FS3 of the free stripe block FSB. In this embodiment as depicted in FIG. 16, the valid data of the third stripe VS3 (l, m, n and o) is stored into a first, a second, a fourth and a sixth page of the third stripe VS3 of the victim stripe block VSB. The memory controller 710 controls so that the valid data of the third stripe VS3 (l, m, n and o) of the victim stripe block VSB may be copied into a first, a second, a fourth and a sixth page of a third stripe FS3 of the free stripe block FSB, respectively.

In one embodiment, an electronic device 700 may use an external bus bandwidth efficiently not by merely reading and copying the valid data to another flash memory chip but by copying the valid data from each of the plurality of flash memory chips 60-1 to 60-n into an another flash memory chip in an identical arrangement. This more efficient manner of copying may be similar to an internal copyback, or a semi-external copyback of a flash memory and is described more fully below. For example, a valid data of 'n' stored in a fourth flash memory chip 60-4 of the third stripe VS3 of the victim stripe block VSB may be copied into a fourth flash memory chip 60-4 of the third stripe FS3 of the free stripe block FSB, such that the physical arrangement of valid data in the victim stripe block VSB is the same as the physical arrangement of the data copied to the free stripe block FSB.

In one embodiment, this type of copying is more efficient because the mapping table 65-2 of the free stripe block FSB may initially be copied from the mapping table 65-1 of the victim stripe block VSB. The Logical Address entries for pages with valid data may not need to be updated in the mapping table 65-2 for the free stripe block because the physical address of the valid data that is copied into the free stripe block FSB corresponds to the physical address of the valid data in the victim stripe block VSB.

In one embodiment, the only data remaining in the buffer memory 720 that corresponds to the write command of a host HOST is d7 and d8. After the garbage collection operation is performed, the memory controller 710 may control to copy the data from the buffer memory 720 (d7 and d8) to the free pages of the third stripe FS3 of the free stripe block FSB.

To determine the flash memory chip of the third stripe FS3 of the free stripe block FSB into which to copy new data d7 and d8 stored in the buffer memory 720, the memory controller 710 may count the number of pages having invalid data in each flash memory chip in the free stripe block FSB. In one embodiment, the count number may be the forward invalid page count (FIPC) and may be associated with that flash memory chip. The memory controller 710 may generate a forward invalid page count FIPC for each flash memory chip 60-1 to 60-n or may only generate a FIPC for a flash memory chip in the stripe that does not store data.

For example, in the exemplary embodiment depicted in FIG. 16, after the copying of the valid data from the first two stripes VS1 and VS2 and the data from the buffer memory 720, d1-d7, the flash memory chip 60-2 has three pages that have invalid data, so that the FIPC of the flash memory chip 60-2 is 3. In one embodiment, the FIPC of each flash memory chip at this point in the garbage collection process is 3, 3, 0, 4, 1, 1 and 2, respectively. In one embodiment, each page in a stripe of the FSB that is free to store data may keep track of the FIPC for the flash memory chip in which that page is physically located. In an embodiment depicted in FIG. 16, third, a fifth and a seventh flash memory chip 60-3, 60-5 and 60-7 of the third stripe FS3 of the free stripe block FSB are empty, and the FIPC of the empty flash memory chips 60-3, 60-5 and 60-7 is 0, 1 and 2, respectively.

In one embodiment, data d7 and d8 stored in the buffer memory 720 may be copied in order of the flash memory chip having the highest FIPC among each FIPC of the empty flash memory chips 60-3, 60-5 and 60-7. For example, since a seventh flash memory chip 60-7 has the highest FIPC value (3) among each FIPC of the empty flash memory chips 60-3, 60-5 and 60-7, a data of 'd7' stored in the buffer memory 720 may be copied into a seventh flash memory chip 60-7 of the third stripe FS3 of the free stripe block FSB.

After the data of 'd7' stored in the buffer memory 720 is copied into the seventh flash memory chip 60-7 of the third stripe FS3 of the free stripe block FSB, a data of 'd8' stored in the buffer memory 720 may be copied into a fifth flash memory chip 60-5 of the third stripe FS3 of the free stripe block FSB, which has the second highest count value (1).

The garbage collection operation is then resumed. According to an example embodiment, since the third memory chip 60-3 of the third stripe FS3 of the free stripe block FSB is empty, the first page of valid data remaining in the third memory chip 60-3 of the victim stripe block VSB may be copied into the free memory space in the third memory chip 60-3 in the third stripe FS3 of the free stripe block FSB. The memory controller 710 may control to copy data 'q' stored in a third page of a fourth stripe VS4 of the victim stripe block VSB to a third flash memory chip 60-3 into the last empty page in the third stripe FS3 of the free stripe block FSB.

In one embodiment, the mapping tables 65-1 and 65-2 may be updated in a manner similar to that described above. Further, the memory controller 710 may control the plurality of flash memory chips 60-1, 60-2, ..., 60-n to generate a parity p3' to be stored in a page in each stripe in a manner similar to that described above.

When the valid data in all of the stripes VS1 to VSn of the victim stripe block VSB are copied into all of the stripes FS1 to FSn of the free stripe block FSB, the garbage collection process is completed. In one embodiment, the victim stripe block VSB may then be reclaimed. The electronic device 700 may improve a write performance of the plurality of memory chips 60-1 to 60-n by helping write new data during the garbage collection process.

Figure 17:
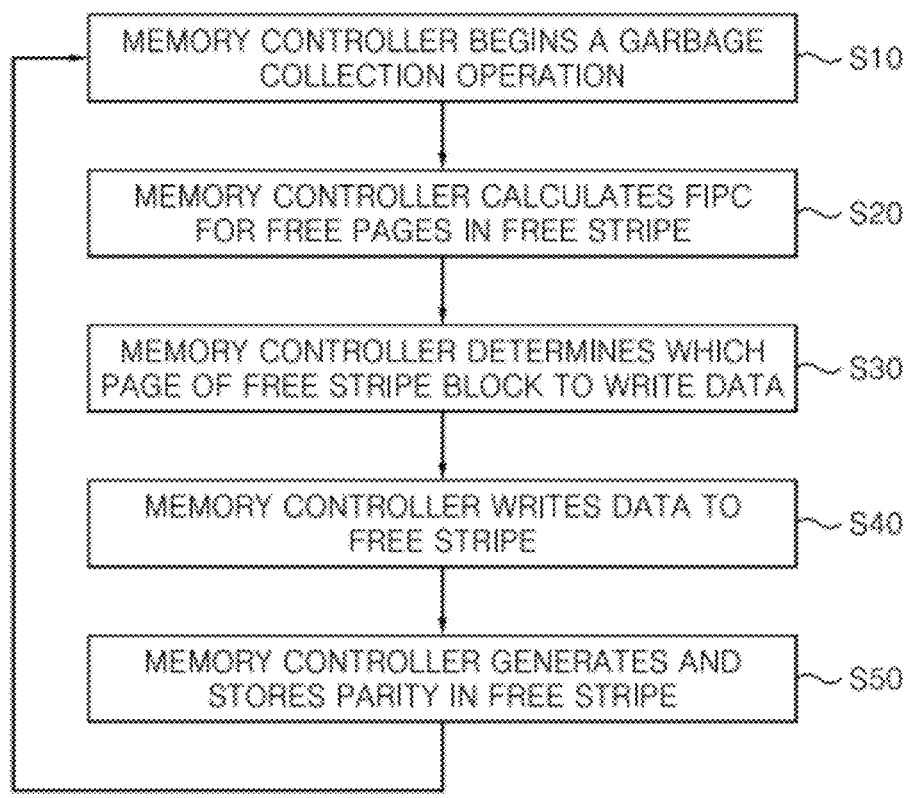
FIG. 17 is a flowchart displaying an exemplary operation method of the memory controller illustrated in FIG. 13.

FIG. 17 is a flowchart that displays an exemplary operation method of the memory controller illustrated in FIG. 13. Referring to FIGS. 13 to 17, the memory controller 710 begins garbage collection on the victim stripe block VSB and may perform a garbage collection operation (S10), where a garbage collection operation processes a stripe of data from a stripe block. In this step, all of the valid data in a first stripe from a victim stripe block VSB is copied to a first stripe in the free stripe block FSB such that the arrangement of the valid data is identical in each stripe block. In one embodiment of this step, the valid data (l, m, n and o in a first, a second, a fourth, and a sixth page of the victim stripe) is copied to a first, a second, a fourth and a sixth page of the first stripe FS3 of the free stripe block FSB, respectively.

After the garbage collection operation, the memory controller 710 may calculate a FIPC (forward invalid page count) for each page in the stripe that is free to store data (S20). In one embodiment, the WAF is 3 and the buffer memory 720 only stores 2 pieces of data. In one embodiment of this step, the memory controller 710 may determine which page of the first stripe to copy a first and a second data stored in the buffer memory 720 by using the FIPC of each memory chip, as stored in the pages of the stripe as described above (S30). In another embodiment, the memory controller 710 may copy data from the buffer memory 720 using the FIPC of each memory chip until all of the free pages of the first stripe of the free stripe block FSB store data without regard to the WAF. In this embodiment, if the WAF is 2 and five pages in the first stripe block FSB are able to store data, the memory controller 710 may write a first, a second, a third, a fourth, and a fifth data from the memory buffer 720 into the first stripe of the free stripe block FSB using the FIPC of each memory chip. The memory controller 720 may control to copy an amount of data in accordance with the WAF to the free stripe block FSB (S40).

After the first stripe is filled or a WAF amount of data has been written into the first stripe, the memory controller may control to generate a parity for the first stripe and store it in a page in the first stripe (S50). The memory controller 710 may then perform a garbage collection operation on the second stripe (S10). The memory controller 710 may continue to perform steps S10, S20, S30, S40, and S50 until all of the write data corresponding to the write command from the host HOST is written to the free block stripe. The memory controller 710 may continue to perform garbage collection operations as well until the garbage collection of the victim stripe block is completed.

Figure 18:
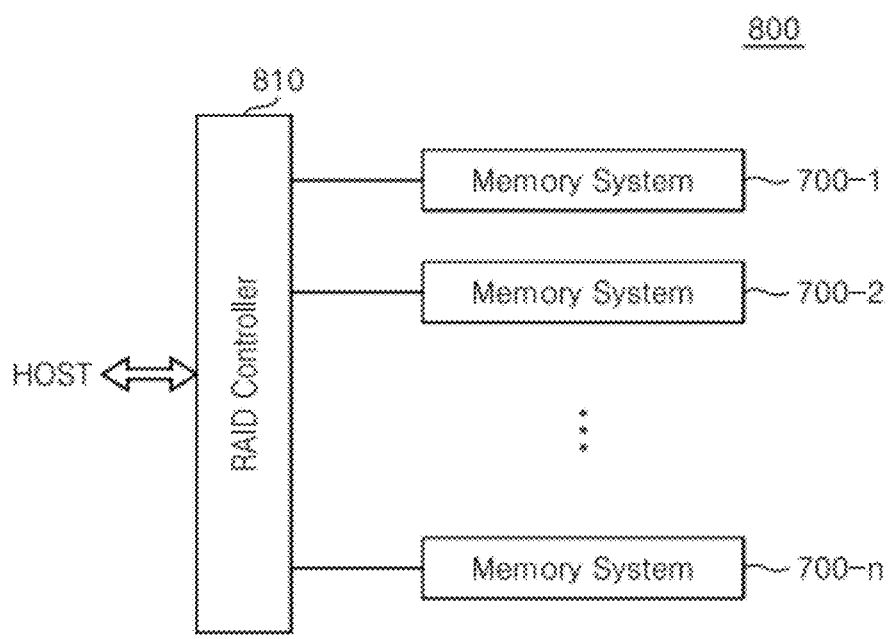
FIG. 18 depicts an example embodiment of a data processing device including the electronic device illustrated in FIG. 13.

FIG. 18 depicts an example embodiment of a data processing device that includes the electronic device illustrated in FIG. 13. Referring to FIGS. 13 and 18, a data storage device 800 which may be embodied in a redundant array of independent disks (RAID) system may include a RAID controller 810 and a plurality of memory systems 700-1 to 700-n, where n is a positive integer.

Each of the memory systems 700-1 to 700-n may be the electronic device 700 illustrated in FIG. 13. The plurality of memory systems 700-1 to 700-n may compose a RAID array. The data storage device 800 may be embodied in a personal computer (PC) or a SSD.

During a write operation, a RAID controller 810 may output data output from a host HOST to one of the plurality of memory systems 700-1 to 700-n according to a RAID level which is selected based on RAID level information output from the host HOST among a plurality of RAID levels.

During a read operation, the RAID controller 810 may transmit data read by a memory module of one of the plurality of memory systems 700-1 to 700-*n* to the host HOST according to one of a plurality of RAID levels, which is selected based on RAID level information output from the host HOST.

A memory device according to the disclosed embodiments may improve a write performance of a flash memory by helping write new data during a garbage collection operation. Although the garbage collection process has been described as being interrupted by a write command and write data from the host HOST, other commands that involves copying, writing, or other manipulations of data in the flash memory may interrupt the garbage collection process. The type of program command or control signal that interrupts the garbage collection process is not limited to the examples described herein.

The above-disclosed subject matter is to be considered illustrative and not restrictive, and the appended claims are intended to cover all such modifications, enhancements, and other embodiments, which fall within the true spirit and scope of the disclosed embodiments. Thus, the invention is to be determined by the broadest permissible interpretation of the following claims and their equivalents, and shall not be restricted or limited by the foregoing detailed description.

What is claimed is:

1. A method of manipulating data in a flash memory in a memory device while performing garbage collection of the flash memory, the method comprising the steps of:
   beginning a garbage collection process on one or more victim blocks of flash memory, the garbage collection process comprising performing one or more garbage collection operations, where each operation copies a set of valid data from the one or more victim blocks to a first free block in the flash memory;
   beginning a first garbage collection operation;
   during the first garbage collection operation:
      receiving a program command with a corresponding amount of program data, and
      storing at least a portion of the program data in a buffer memory in the memory device;
   after the first garbage collection operation is performed, copying a first set of the program data from the buffer memory to the first free block; and
   when additional valid data remains in the one or more victim blocks after the copying of the first set of the program data, performing a second garbage collection operation of the garbage collection process,
   wherein the first set of program data copied to the one or more free blocks includes a quantity of data that corresponds to a write amplification number ("WAF"), the WAF indicating a quantity of program data to be written from the buffer memory to one or more free blocks including the first free block after each garbage collection operation,
   wherein the WAF is a WAF received from the host and stored in the flash memory.

2. The method of claim 1, wherein, if additional program data remains in the buffer memory after the step of performing the second garbage collection operation, the method further comprises the step of:
   copying a second set of the program data from the buffer memory to the first free block.

3. The method of claim 2, wherein the first set of the program data and the second set of the program data each include a quantity of data that correspond to the WAF.

4. A method of manipulating data in a memory system comprising a plurality of memory chips while performing garbage collection of the memory system, the method comprising the steps of:
   beginning a garbage collection process on one or more victim stripe blocks of the memory system, wherein:
      the memory system includes a plurality of stripe blocks, each stripe block including at least one stripe, where a stripe is a combination of an Nth page, where N is a positive integer, in each memory cell array of a block across the plurality of memory chips, and
      the garbage collection process comprises performing one or more garbage collection operations, where each operation copies valid data from at least one victim stripe in the victim stripe block to at least one free stripe in a free stripe block in the memory system;
   beginning a first garbage collection operation;
   while performing the first garbage collection operation:
      receiving a program command with a corresponding amount of program data, and
      storing at least a portion of the program data in a buffer memory in the memory system;
   after the first garbage collection operation is performed, copying a first set of the program data from the buffer memory to the free stripe; and
   when the victim stripe block has additional victim stripes that include valid data after the step of copying the first set of the program data, performing a second garbage collection operation of the garbage collection process;
   wherein the first set of program data copied from the buffer memory to the free stripe includes a quantity of data that corresponds to a write amplification number ("WAF"), the WAF indicating a quantity of program data to be written from the buffer memory to the free stripe after each garbage collection operation, and
   wherein the WAF is a WAF received from the host and stored in the flash memory.

5. The method of claim 4, wherein, if additional program data remains in the buffer memory after the step of performing the second garbage collection operation, the method further comprises the step of:
   copying a second set of the program data from the buffer memory to the free stripe,
   wherein the first set of the program data and the second set of the program data each include a quantity of data that correspond to the WAF.

6. The method of claim 4, further comprising the step of:
   generating and storing a parity for a free stripe in the free stripe block after one or more pages in the free stripe includes data,
   wherein the data in the one or more pages of the free stripe includes at least one of flash data copied from a victim stripe and program data copied from the buffer memory.

7. The method of claim 1, wherein:
   each garbage collection operation copies a set of valid data from the one or more victim blocks to the one or more free blocks in the flash memory such that the arrangement of the data copied to the one or more free blocks is identical to the arrangement of the set of valid data in the one or more victim blocks, and
   copying a first set of the program data from the buffer memory comprises copying a first set of the program data from the buffer memory to at least one free page in the one or more free blocks.

8. The method of claim 7, wherein, after a garbage collection operation, a physical arrangement of the set of valid data in the one or more victim blocks corresponds to a physical arrangement of the data copied to the one or more free blocks.

9. A memory device comprising:
   a flash memory including a plurality of blocks, the plurality of blocks including one or more blocks configured to be a victim block subject to a garbage collection process and one or more free blocks;
   a CPU configured to receive a program command and program data corresponding to the program command;
   a buffer memory configured to store the program data; and
   a memory controller configured to control the flash memory to begin a garbage collection process on the victim block, where the garbage collection process comprises at least one garbage collection operation, wherein, for each garbage collection operation, the memory controller is configured to copy a set of valid data from the one or more victim blocks to the one or more free blocks in the flash memory,
   wherein the memory controller is configured to:
   control the flash memory to perform a first garbage collection operation;
   control the flash memory to copy a first set of the program data to the one or more free blocks, and when additional valid data remains in the one or more victim blocks, control the flash memory to perform a second garbage collection operation, and
   wherein the first set of program data copied to the free block includes a quantity that corresponds to a write amplification number ("WAF"), the WAF indicating a quantity of program data to be written from the buffer memory to the one or more free blocks after each garbage collection operation, wherein the WAF is a WAF received from the host and stored in the flash memory.

10. The memory device of claim 9, wherein,
   for each garbage collection operation, the memory controller is configured to copy a set of valid data from the one or more victim blocks to the one or more free blocks in the flash memory such that the arrangement of the data copied to the one or more free blocks is identical to the arrangement of the set of valid data in the one or more victim blocks.

* * * * *